United States Patent
Zhang et al.

(10) Patent No.: US 9,787,685 B2
(45) Date of Patent: Oct. 10, 2017

(54) METHODS, DEVICES AND SYSTEMS FOR MANAGING AUTHORITY

(71) Applicant: Xiaomi Inc., Beijing (CN)

(72) Inventors: Yang Zhang, Beijing (CN); Bo Zhang, Beijing (CN)

(73) Assignee: Xiaomi Inc., Beijing (CN)

( * ) Notice: Subject to any disclaimer, the term of this patent is extended or adjusted under 35 U.S.C. 154(b) by 176 days.

(21) Appl. No.: 14/641,593

(22) Filed: Mar. 9, 2015

(65) Prior Publication Data

US 2015/0373024 A1 Dec. 24, 2015

Related U.S. Application Data

(63) Continuation of application No. PCT/CN2014/091746, filed on Nov. 20, 2014.

(30) Foreign Application Priority Data

Jun. 24, 2014 (CN) .......................... 2014 1 0286860

(51) Int. Cl.
  *H04L 29/06* (2006.01)
  *H04L 12/24* (2006.01)
  *G06F 21/62* (2013.01)
  *G06N 99/00* (2010.01)

(52) U.S. Cl.
  CPC ........ *H04L 63/101* (2013.01); *G06F 21/6218* (2013.01); *H04L 41/00* (2013.01); *H04L 63/08* (2013.01); *G06N 99/005* (2013.01)

(58) Field of Classification Search
  CPC combination set(s) only.
  See application file for complete search history.

(56) References Cited

U.S. PATENT DOCUMENTS

| 7,984,488 | B2  |   | 7/2011 | Cross et al. |   |
|-----------|-----|---|--------|--------------|---|
| 8,265,595 | B1  | * | 9/2012 | Reeves       | H04M 1/72577 455/410 |
| 8,406,734 | B2  | * | 3/2013 | Otaka        | H04L 67/34 455/410 |
| 8,955,056 | B2  | * | 2/2015 | Choi         | G06F 9/445 709/225 |
| 9,141,801 | B2  | * | 9/2015 | Moon         | G06F 21/57 |

(Continued)

FOREIGN PATENT DOCUMENTS

| CN | 1564980   | 1/2005 |
| CN | 101005699 | 7/2007 |

(Continued)

OTHER PUBLICATIONS

Extended European Search Report received from European Patent Office for Application No. 15172117.2, dated Nov. 24, 2015, (7 pages).

(Continued)

*Primary Examiner* — Taghi Arani
*Assistant Examiner* — Phy Anh Vu
(74) *Attorney, Agent, or Firm* — Finnegan, Henderson, Farabow, Garrett & Dunner LLP

(57) ABSTRACT

A method for a device to connect to a wireless network is provided. The method includes: acquiring authority use data of a user; processing the authority use data to obtain an authority result; and sending the authority result to a terminal device.

10 Claims, 43 Drawing Sheets

(56) References Cited

U.S. PATENT DOCUMENTS

| | | | |
|---|---|---|---|
| 9,230,134 B1* | 1/2016 | Grigera | G06F 21/6245 |
| 2002/0169977 A1 | 11/2002 | Chmaytelli | |
| 2003/0028592 A1 | 2/2003 | Ooho et al. | |
| 2003/0061504 A1* | 3/2003 | Sprigg | G06F 21/53 726/6 |
| 2003/0115484 A1 | 6/2003 | Moriconi et al. | |
| 2005/0257072 A1 | 11/2005 | Cross et al. | |
| 2007/0067565 A1 | 3/2007 | Taninaka et al. | |
| 2007/0209063 A1* | 9/2007 | Ohto | H04L 63/20 726/4 |
| 2008/0028449 A1 | 1/2008 | Shigeeda et al. | |
| 2008/0189793 A1* | 8/2008 | Kirkup | G06F 21/53 726/27 |
| 2008/0256086 A1* | 10/2008 | Miyoshi | G06F 21/6272 |
| 2012/0036130 A1 | 2/2012 | Light et al. | |
| 2012/0303425 A1* | 11/2012 | Katzin | G06Q 20/027 705/14.4 |
| 2013/0055378 A1* | 2/2013 | Chang | G06F 21/53 726/17 |
| 2013/0055411 A1* | 2/2013 | Yang | H04W 12/08 726/30 |
| 2013/0067563 A1 | 3/2013 | Park et al. | |
| 2013/0347096 A1* | 12/2013 | Lee | G06F 21/30 726/17 |
| 2014/0108442 A1* | 4/2014 | Paglia | G06F 17/30386 707/758 |
| 2014/0201126 A1* | 7/2014 | Zadeh | G06K 9/627 706/52 |
| 2014/0366111 A1* | 12/2014 | Sheller | H04L 63/08 726/7 |
| 2015/0128240 A1* | 5/2015 | Richards | H04L 63/0861 726/7 |
| 2015/0163668 A1 | 6/2015 | Wu et al. | |

FOREIGN PATENT DOCUMENTS

| | | |
|---|---|---|
| CN | 101083527 | 12/2007 |
| CN | 101166118 | 4/2008 |
| CN | 101655892 | 2/2010 |
| CN | 102238276 | 11/2011 |
| CN | 103077335 | 5/2013 |
| CN | 103514397 | 1/2014 |
| CN | 103533546 | 1/2014 |
| CN | 103546436 | 1/2014 |
| CN | 103701778 | 4/2014 |
| CN | 103701905 | 4/2014 |
| CN | 103747433 | 4/2014 |
| CN | 104125335 | 10/2014 |
| EP | 1389752 A2 | 2/2004 |
| GB | 2236604 A | 4/1991 |
| JP | 2002190847 A | 7/2002 |
| JP | 2006-511000 A | 3/2006 |
| JP | 2006216061 A | 8/2006 |
| JP | 4100148 B2 | 6/2008 |
| JP | 2008192104 A | 8/2008 |
| JP | 2009-175868 A | 8/2009 |
| JP | 2012-033189 A | 2/2012 |
| JP | 2013159926 A | 8/2013 |
| KR | 1020130048438 | 8/2013 |
| RU | 2408069 C2 | 12/2010 |
| WO | WO 02/14989 A2 | 2/2002 |
| WO | WO 2007/063414 A2 | 6/2007 |

OTHER PUBLICATIONS

English Translation, "Method for checking the permission of automatically update," available at http://www.ipa.go.jp/security/txt/2012/05outline.html , dated May 7, 2012 (18 pages).

English Translation, Ayuki Miike: "Smartphone Personal Information Is Dangerous," Engineering Co., Ltd., First edition, Jan. 25, 2013, pp. 156-157 (5 pages).

Android—Security Bible, http://tomoyo.sourceforge.jp/1.7/android-arm.himl.ja, Jul. 2013 ( 4 pages).

English translation of International Search Report for Application No. PCT/CN2014/091746, dated Mar. 27, 2015, (2 pages).

International Search Report of PCT/CN2014/091746, mailed from the State Intellectual Property Office of China on Mar. 27, 2015.

* cited by examiner

300

Settings Related

Turn on Mobile Network
Turn on Mobile Network

Turn on WiFi
Turn on WiFi

Turn on Bluetooth
Turn on Bluetooth

Pop up a Floating Window
Pop up a Floating Window on the Interface of Your Cell Phone

Control Sleeping
Control Whether to Make Your Cell Phone Sleep

System Settings
Modify System Settings

Fees Related

Send SMS
Directly Send SMS and MMS

Phone Call
Make, Answer or Hang Up Phone Calls

Privacy Related

SMS
Access Your SMS and MMS Inboxes

Contacts
Access Your Contact List

Call Logs
Access Your Call Logs

Calendar
Access Your Calendar Data

Positioning
Locate Your Phone Through Network or Satellite

Fig. 12a

Multimedia Related

Take Pictures and Record Videos
Take Pictures and Record Videos

Record Sound
Carry Out Call Recording and Local Recording

Settings Related

Turn on Mobile Network
Turn on Mobile Network

Turn on WiFi
Turn on WiFi

Turn on Bluetooth
Turn on Bluetooth

Pop up a Floating Window
Pop up a Floating Window on the Interface of Your Cell Phone

Control Sleeping
Control Whether to Make Your Cell Phone Sleep

System Settings
Modify System Settings

Fig. 12b

METHODS, DEVICES AND SYSTEMS FOR MANAGING AUTHORITY

CROSS-REFERENCE TO RELATED APPLICATIONS

This application is a continuation of International Application No. PCT/CN2014/091746, filed Nov. 20, 2014, which is based upon and claims priority to Chinese Patent Application No. 201410286860.6, filed Jun. 24, 2014, the entire contents of all of which are incorporated herein by reference.

TECHNICAL FIELD

The present disclosure generally relates to smart devices and, more particularly, to methods, devices and systems for managing an authority.

BACKGROUND

Authority management has become important for smart devices as a number of applications may be installed in the smart devices. Authority management generally means that a user may only access resources that are authorized according to security rules or security strategies set by systems.

Conventionally, according to different levels of users, different authority operations may be granted by the systems. For example, in an Android system, authorities are classified into different levels, and predefined authorities in the system belong to different levels according to different functions granted. For example, general authorities may be granted to applications according to settings of the users, and system authorities may be granted only to applications that are certified at a platform level. When the applications try to perform operations without being granted authorities, the applications may not be permitted to perform the operations, and an alert may be provided to the user. On the other hand, system applications may be granted authority to perform any operation, and a declarant of an authority may be granted the authority without any limitations.

SUMMARY

According to a first aspect of the present disclosure, there is provided a method for managing an authority, comprising: acquiring authority use data of a user; processing the authority use data to obtain an authority result; and sending the authority result to a terminal device.

According to a second aspect of the present disclosure, there is provided a method for managing an authority, comprising: receiving an authority result sent from a server; acquiring configuration information of the authority based on the authority result; and updating a corresponding authority option based on the configuration information of the authority.

According to a third aspect of the present disclosure, there is provided a device for managing an authority, comprising: a processor; and a memory for storing instructions executable by the processor. The processor is configured to: acquire authority use data of a user; process the authority use data to obtain an authority result; and send the authority result to a terminal device.

It is to be understood that both the foregoing general description and the following detailed description are exemplary rather than limiting the present disclosure.

BRIEF DESCRIPTION OF THE DRAWINGS

The accompanying drawings, which are incorporated in and constitute a part of this specification, illustrate embodiments being consistent with the invention and serve to explain the principles of the invention.

FIG. 3 is a diagram illustrating an interface after an authority option is updated, according to an exemplary embodiment.

FIG. 12a is a diagram illustrating an interface of authority options, according to an exemplary embodiment.

FIG. 12b is a diagram illustrating an interface of authority options, according to an exemplary embodiment.

DETAILED DESCRIPTION

Reference will now be made in detail to exemplary embodiments, examples of which are illustrated in the accompanying drawings. When accompanying drawings are mentioned in the following description, the same numbers in different drawings represent the same or similar elements, unless otherwise represented. The following exemplary embodiments and description thereof intend to illustrate, rather than to limit, the present disclosure. Hereinafter, the present disclosure will be described with reference to the drawings.

Figure 1:
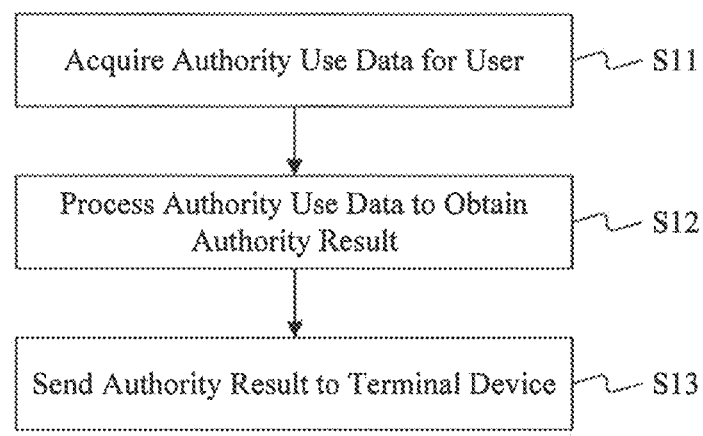
FIG. 1 is a flowchart of a method for managing an authority, according to an exemplary embodiment.

FIG. 1 is a flowchart of a method 100 for managing an authority, according to an exemplary embodiment. For example, the method 100 may be used in a server. Referring to FIG. 1, the method 100 includes the following steps.

In step S11, the server acquires authority use data of a user. The authority use data can be a use record of an authority option of the user. For example, the use record may include a user identification (ID), an application name, a defined operation granted by an authority, and/or an authority selection. The use record may also include a modification record of authority settings. In some embodiments, the authority use data may be acquired from a cloud.

In step S12, the server processes the authority use data to obtain an authority result.

In some embodiments, the authority selection may include permission, rejection, inquiry and default, where the default may refer to the initial authority selection that is not modified. For example, in SMS (Short Message Service), the operation granted by the authority is accessing SMS inbox. The authority selection may be acquired based on statistics of records used by the user. The authority selection of accessing SMS inbox may include, for example, permitting accessing SMS inbox, refusing accessing SMS inbox, inquiring of the user before accessing SMS inbox, or no authority of accessing SMS inbox being set. The server may classify and process the records based on the authority selection to obtain the authority result of the application of accessing SMS inbox.

In step S13, the server sends the authority result obtained by the processing to a terminal device, for the terminal device to update a corresponding authority option.

In some embodiments, the authority result may include a user ID, an application name, a defined operation granted by an authority, and/or an authority selection. When the terminal device receives the authority result sent from the server, the terminal device may perform a corresponding update on the corresponding authority option.

In the method 100, the authority use data of the user may be acquired from the cloud, the authority use data is analyzed and processed to obtain the authority result, and then the authority result is sent to the terminal device for the terminal device to update the authority option of the corresponding application. In doing so, the user may avoid manually changing the authority setting. Moreover, because the authority use data of the user to be analyzed may be acquired from the cloud, the corresponding authority can be automatically updated in time according to latest requirements, so as to simply the process for changing the authority settings of the application.

Figure 2:
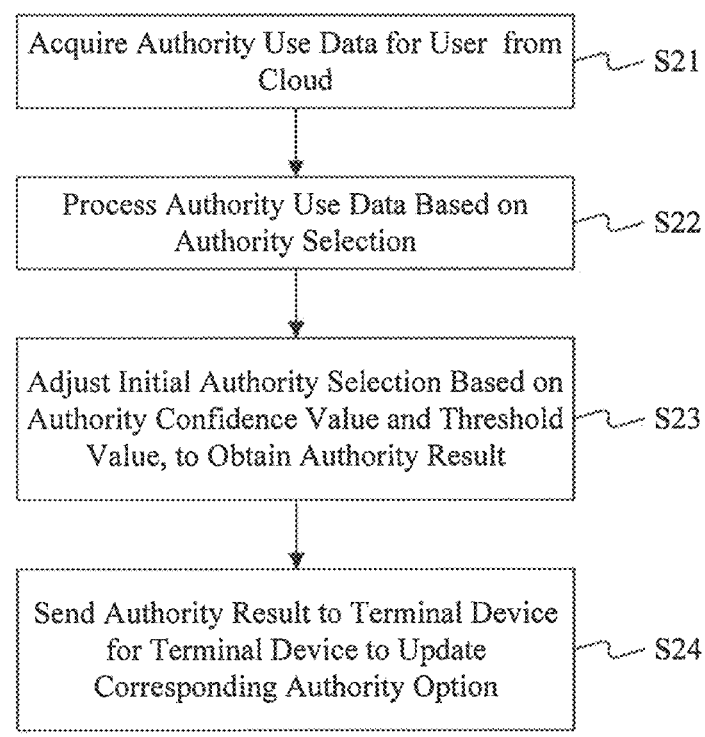
FIG. 2 is a flowchart of a method for managing an authority, according to an exemplary embodiment.

FIG. 2 is a flowchart of a method 200 for managing an authority, according to an exemplary embodiment. For example, the method 200 may be used in a server. Referring to FIG. 2, the method 200 includes the following steps.

In step S21, the server acquires authority use data of a user from a cloud. The authority use data can be a use record of an authority option of the user that is recorded in the cloud. The use record may include a user ID, an application name, a defined operation granted by an authority, and/or an authority selection. The use record may also include a modification record of authority settings.

In some embodiments, sample records may be acquired from history records used by the user in the cloud. The number of the acquired sample records may be set, and the number of the acquired sample records may be based on, for example, records of the user during a period of time, a preset number of the history records, etc. For example, the records used by the user during a period of time may be acquired as the sample records.

In step S22, the server processes the authority use data based on the authority selection to obtain an authority confidence value and an initial authority selection.

In some embodiments, the authority selection may include permission, rejection, inquiry and default, where the default may refer to the initial authority selection that is not modified. For example, in SMS (Short Message Service), the defined operation granted by the authority is accessing SMS inbox. The authority selection may be acquired based on statistics of records used by the user. The authority selection of accessing SMS inbox may include, for example, permitting accessing SMS inbox, refusing accessing SMS inbox, inquiring of the user before accessing SMS inbox or no authority of accessing SMS inbox being set. The records may be classified and processed according to the authority selection, to obtain the authority result of the application of accessing SMS inbox.

The processing of the authority use data in step S22 may be online processing, or offline processing.

In step S23, the server adjusts the initial authority selection based on the authority confidence value and a threshold value, to obtain the authority result. For example, the authority confidence value is a value for representing reliability of the authority result, which indicates a degree of reliability. When the records of the user are sampled, by applying a statistical method, e.g., an interval estimation method in mathematical statistics, the probability that an estimated value is within a certain allowable error range of the true value can be determined. The probability is referred to as the authority confidence value, and the threshold value refers to the lowest authority confidence value that meets the requirements.

In step S24, the server sends the authority result to the terminal device, for the terminal device to update a corresponding authority option.

In some embodiments, the authority result may include a user ID, an application name, a defined operation granted by an authority, and/or an authority selection. When the terminal device receives the authority result from the server, the terminal device may perform a corresponding update on the authority option.

FIG. 3 is a diagram illustrating an interface 300 of authority options, according to an exemplary embodiment. For example, in the authority result, the authority options for a mobile network, WiFi, Bluetooth, a floating window, a sleeping setting, and system settings are turning on the mobile network, turning on WiFi, turning on Bluetooth, popping up the floating window, controlling sleeping, modifying the system settings, respectively. As shown in FIG. 3, the terminal device updates the authority options in the interface 300 according to the authority result.

In the method 200, the authority use data of the user is acquired from the cloud, the authority use data is analyzed and processed to obtain the authority result, and then the authority result is sent to the terminal device, for the terminal device to automatically update the authority option of the corresponding application. In doing so, the user may avoid manually changing the authority setting. Moreover, because the authority use data of the user may be acquired from the cloud, the corresponding authority can be automatically updated in time based on latest requirements, thereby simplifying the process for updating the authority settings of the application.

Figure 4:
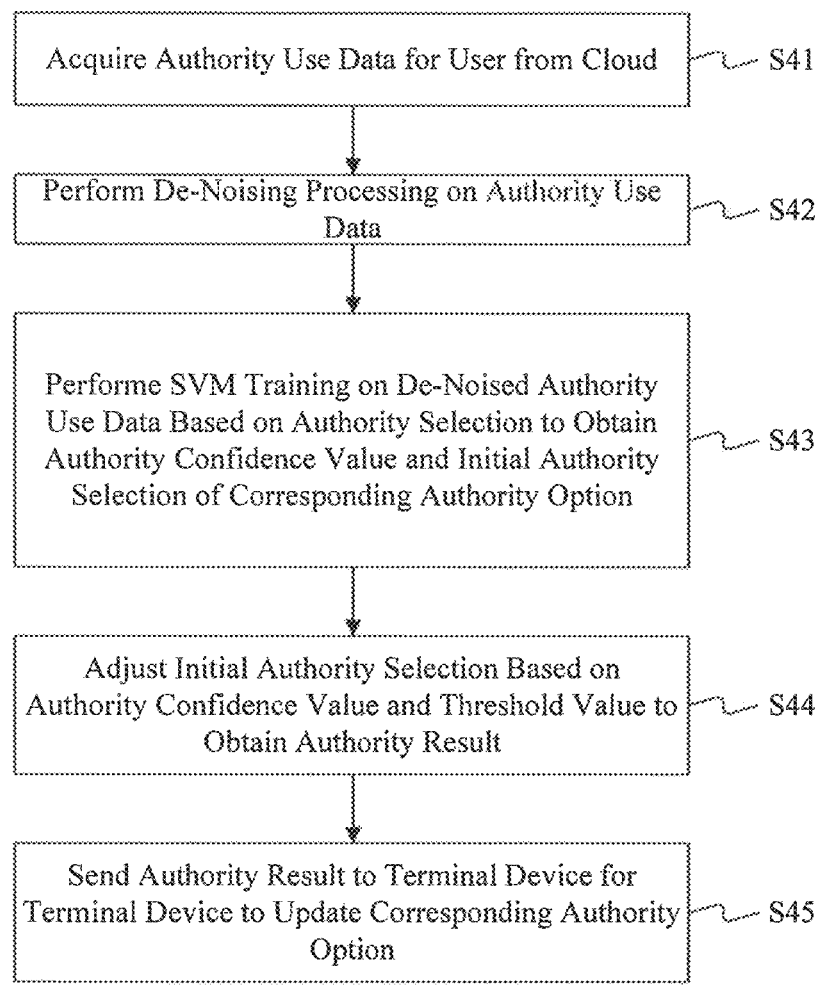
FIG. 4 is a flowchart of a method for managing an authority, according to an exemplary embodiment.

FIG. 4 is a flowchart of a method 400 for managing an authority, according to an exemplary embodiment. For example, the method 400 may be used in a server. Referring to FIG. 4, the method 400 includes the following steps.

In step S41, the server acquires authority use data of a user from a cloud. The authority use data can be a use record of an authority option of the user that is recorded in a cloud. The use record may include a user 11), an application name, a defined operation granted by an authority, and/or an authority selection. The use record may also include a modification record of authority settings. In the method 400, the process for acquiring the authority use data of the user from the cloud is similar to step S21 described above in connection with FIG. 2.

In step S42, the server performs de-noising processing on the authority use data. The de-noising processing includes, e.g., removing noise data and invalid data, which may be based on wavelet analysis, an offline curve de-noising processing, or the like.

In step S43, the server performs a Support Vector Machine (SVM) training on the de-noised authority use data based on the authority selection to obtain an authority confidence value and an initial authority selection of the corresponding authority option. The authority selection may be a permission or rejection in the authority option, and the SVM is known as a trainable machine learning method.

In some embodiments, a linear SVM training classifier f: (user, app, permission)→decision may be applied to the de-noised authority use data, where "user" refers to the user, "app" refers to the application name, and "permission" refers to whether the authority is permitting to be accessed while training. The training is performed with respect to the two selections "permission" or "rejection", and "decision" refers to the obtained initial authority selection of the user. Based on the linear SVM training classifier f: (user, app, permission)→decision, the initial authority selection and the authority confidence value of the user are obtained. In the obtained training result, the result of the initial authority selection may include "permission" or "rejection", and the authority confidence value refers to a value for representing reliability of the authority result.

In step S44, the server adjusts the initial authority selection based on the authority confidence value and a threshold value, to obtain the authority result. The authority result may include a user ID, an application name, a defined operation granted by an authority, and/or an authority selection.

Figure 5:
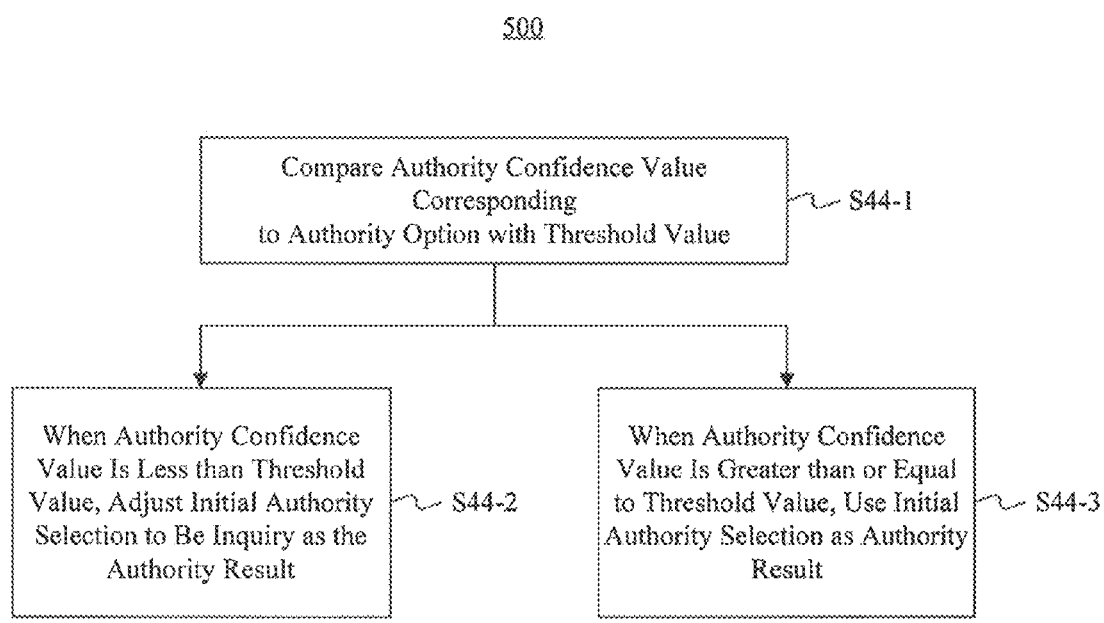
FIG. 5 is a flowchart of a method for obtaining an authority result, according to an exemplary embodiment.

FIG. 5 is a flowchart of a method 500 for obtaining an authority result, according to an exemplary embodiment. As shown in FIG. 5, the method 500 includes the following steps.

In step S44-1, the server compares the authority confidence value corresponding to the authority option with the threshold value.

In some embodiments, the threshold value may be controlled by setting a total inquiry ratio. For example, the threshold value may be controlled by limiting the authority of the inquiry to no more than 10% of the total authority options.

In step S44-2, when the authority confidence value is lower than the threshold value, the server adjusts the initial authority selection to be an inquiry selection, as the authority result. For example, when the authority confidence value is lower than the threshold value that is set, the authority selection of the authority option may be set as inquiry. For example, when the threshold value is 0.3, and the authority confidence value is 0.25, the initial authority selection is adjusted to be the inquiry selection, as the authority result. The result of the initial authority selection may include "permission" and "rejection", and after the confidence value is compared with the threshold value and the adjustment is made, the authority selection may be adjusted to be "inquiry".

In step S44-3, when the authority confidence value is greater than or equal to the threshold value, the server uses the initial authority selection as the authority result. For example, when the threshold value is 0.3, and the authority confidence value is 0.5, the initial authority selection is used as the authority result.

Referring back to FIG. 4, in step S45, the server sends the authority result obtained by the adjustment to the terminal device, for the terminal device to update the corresponding authority option.

In some embodiments, the authority result may include a user ID, an application name, a defined operation granted by an authority, and/or an authority selection. When the terminal device receives the authority result from the server, the terminal device may perform a corresponding update on the authority options. For example, in the authority result, the authority options for a mobile network, WiFi, Bluetooth, a floating window, a sleeping setting, and system settings may be turning on the mobile network, turning on WiFi, turning on Bluetooth, popping up the floating window, controlling sleeping, and modifying the system settings, respectively.

In the method 400, a SVM training is performed on the authority use data of the user that is acquired from the cloud based on the authority selection to obtain the authority result, and the trained authority result is sent to the terminal device for the terminal device to automatically update the corresponding authority option according to the received authority result. In doing so, the user may avoid manually changing the authority setting and improved authority result may be achieved.

Figure 6:
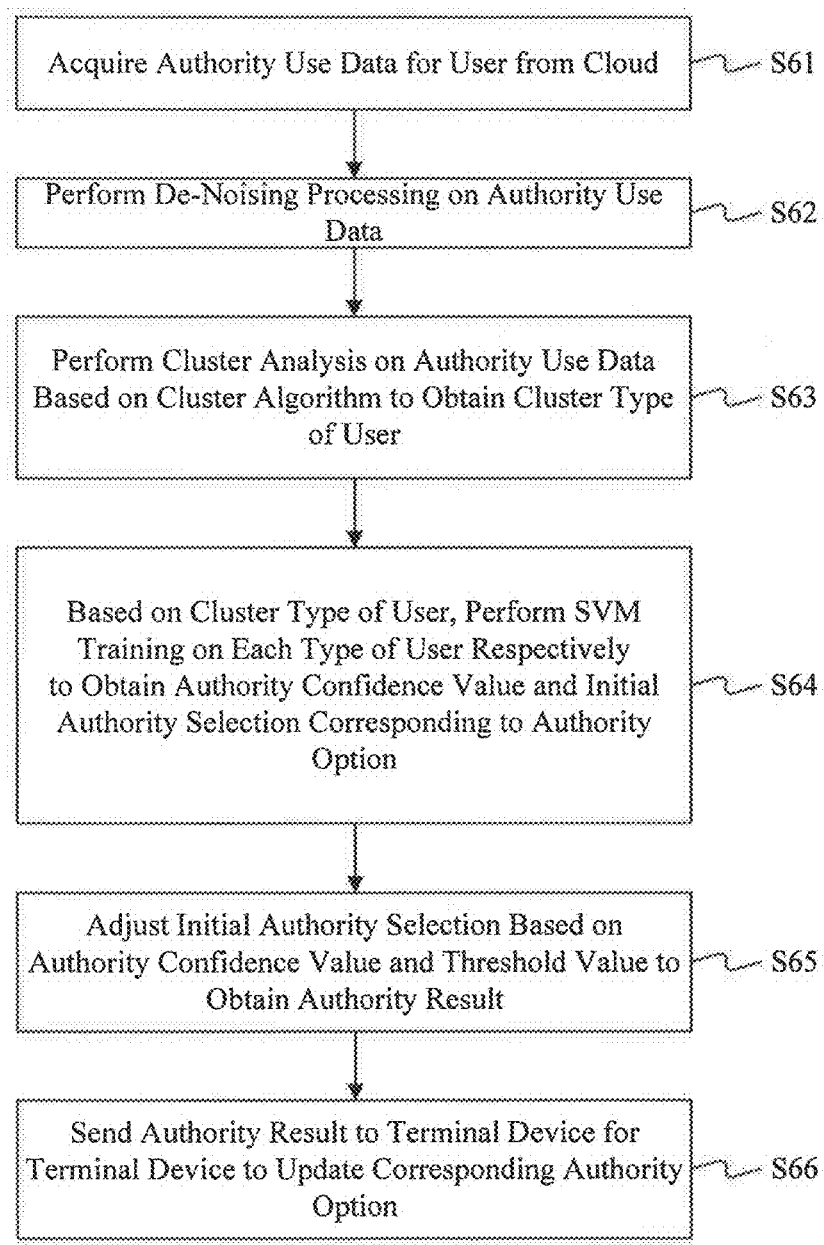
FIG. 6 is a flowchart of a method for managing an authority, according to an exemplary embodiment.

FIG. 6 is a flowchart of a method 600 for managing an authority, according to an exemplary embodiment. For example, the method 600 may be used in a server. Referring to FIG. 6, the method 600 includes the following steps.

In step S61, the server acquires authority use data of a user from a cloud. The authority use data can be a use record of an authority option of the user that is recorded in the cloud. The use record may include a user ID, an application name, a defined operation granted by an authority, and/or an authority selection. The user record may also include a modification record of authority settings.

In the method 600, the process for acquiring the authority use data of the user from the cloud is similar to step S21 described above in connection with FIG. 2.

In step S62, the server performs de-noising processing on the authority use data. The de-noising processing includes removing, e.g., noise data and invalid data, which may be based on wavelet analysis, an offline curve de-noising processing, or the like.

In step S63, the server performs cluster analysis on the authority use data based on a cluster algorithm to obtain a cluster type of the user.

Figure 7:
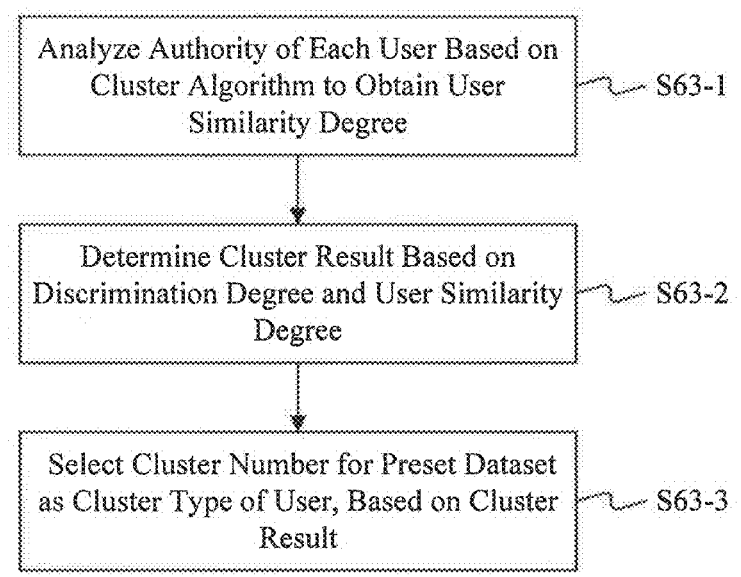
FIG. 7 is a flowchart of a method for performing cluster analysis, according to an exemplary embodiment.

FIG. 7 is a flowchart of a method 700 for performing cluster analysis, according to an exemplary embodiment. As shown in FIG. 7, the method 700 includes the following steps.

In step S63-1, the server analyzes an authority of each user based on the cluster algorithm to obtain a user similarity degree.

For example, suppose there are n authorities, each user may be represented as a n-dimensional vector, and clustering may be performed by using a K-means method to obtain an Euclidean distance of the user, where the Euclidean distance represents the user similarity degree.

In step S63-2, the server determines a cluster result based on a discrimination degree and the user similarity degree.

In step S63-3, the server selects a cluster number for a preset dataset as the cluster type of the user, based on the cluster result.

In some embodiments, the authority can be determined by using a general classifier at first, and after an amount of data is collected after a period of time, the server may determine the type to which the use belongs and then determine the authority by using a classifier of that type.

Referring back to FIG. 6, in step S64, based on the cluster type of the user, the server performs a SVM training on each type of the user respectively based on the authority selection to obtain an authority confidence value and an initial authority selection corresponding to the authority option, where the SVM is a trainable machine learning method.

In some embodiments, a corresponding linear SVM training classifier f: (user, app, permission)→decision is applied to the classified authority use data, where "user" refers to the user, "app" refers to the application name, "permission" refers to whether the authority is permitting to be accessed while training. The training may be performed with respect to the two authority selections "permission" and "rejection", and "decision" refers to the obtained initial authority selection of the user. Based on the linear SVM training classifier f: (user, app, permission)→decision, the initial authority selection and the authority confidence value of the user are obtained. In the obtained training result, the result of the initial authority selection may include "permission" or "rejection", and the authority confidence value refers to a value for representing reliability of the authority result.

In step S65, the server adjusts the initial authority selection based on the authority confidence value and a threshold value, to obtain the authority result. The authority result may include a user ID), an application name, a defined operation granted by an authority, and/or an authority selection.

In step S66, the server sends the authority result obtained by the adjustment to the terminal device, for the terminal device to update the corresponding authority option. The authority result may include a user ID, an application name, a defined operation granted by an authority, and/or an authority selection. When the terminal device receives the authority result sent from the server, the terminal device may perform corresponding update on the authority options. For example, in the authority result, the authority options in a mobile network, WiFi, Bluetooth, a floating window, a sleeping setting, and system settings may be turning on the mobile network, turning on WiFi, turning on Bluetooth, popping up the floating window, controlling sleeping, and modifying the system settings, respectively.

In the method 600, the cluster analysis is performed with respect to the user, and users who have high similarity in habit of setting the authority are clustered and analyzed. Thus, the analyzed authority result is targeted for the user, and the update of the authority settings is more accurate, taking into account the habits of the users.

Figure 8:
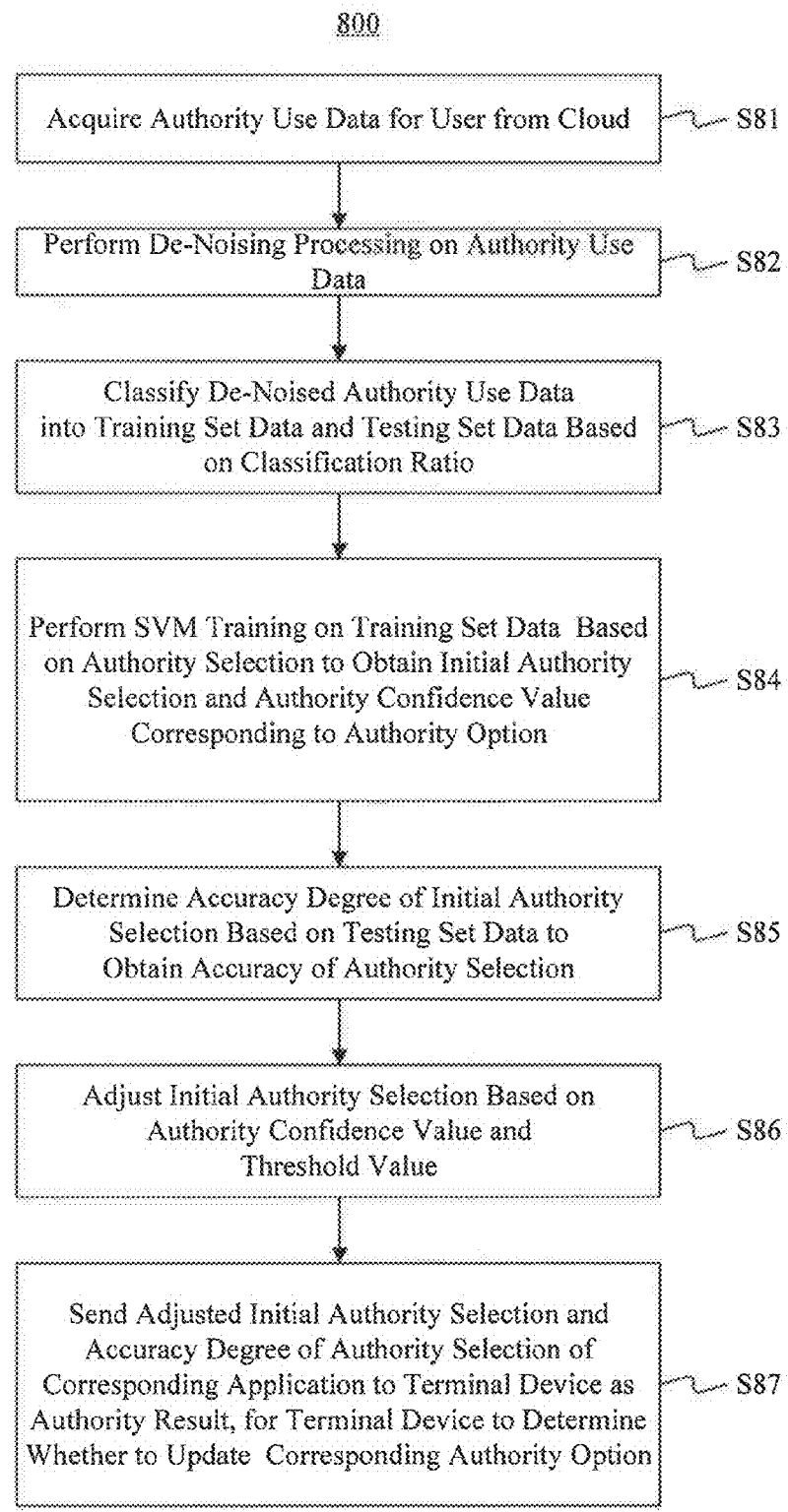
FIG. 8 is a flowchart of a method for managing an authority, according to an exemplary embodiment.

FIG. 8 is a flowchart of a method 800 for managing an authority, according to an exemplary embodiment. For example, the method 800 may be used in a server. Referring to FIG. 8, the method 800 includes the following steps.

In step S81, the server acquires authority use data of a user from a cloud. The authority use data can be a use record of an authority option of the user that is recorded in the cloud. The use record may include a user ID, an application name, a defined operation granted by an authority, and/or an authority selection. The use record may also include a modification record of authority settings.

In the method 800, the process for acquiring the authority use data of the user from the cloud is similar to step S21 described above in connection with FIG. 2.

In step S82, the server performs de-noising processing on the authority use data. The de-noising processing includes removing noise data and invalid data, which may be based on wavelet analysis, an offline curve de-noising processing, or the like.

In step S83, the server classifies the de-noised authority use data is into training set data and testing set data based on a classification ratio. The classification ratio may be set according to requirements of the testing set data and the training set data. For example, entire data of 90% users, as well as data of 20% applications of the remaining 10% users may be used as the training set data, and the other 80% applications of the remaining 10% users may be used as the testing set data. The data may be randomly assigned.

In step S84, the server performs a SVM training on the training set data based on the authority selection of permission or rejection in the authority option, to obtain an initial authority selection and an authority confidence value corresponding to the authority option. The SVM is a trainable machine learning method.

In some embodiments, a linear SVM training classifier f: (user, app, permission)→decision may be applied to the de-noised authority use data, where "user" refers to the user, "app" refers to the application name, "permission" refers to whether the authority is permitting to be accessed while training. The training is performed with respect to the authority selection of "permission" and "rejection", and "decision" refers to the obtained initial authority selection of the user. Based on the linear SVM training classifier f: (user, app, permission)→decision, the initial authority selection and the authority confidence value of the user are obtained. In the obtained training result, the result of the initial authority selection may be "permission" or "rejection", where the authority confidence value refers to a value for representing reliability of the authority result.

In step S85, the server determines an accuracy degree of the initial authority selection based on the testing set data, to obtain an accuracy degree of the authority selection.

Figure 9:
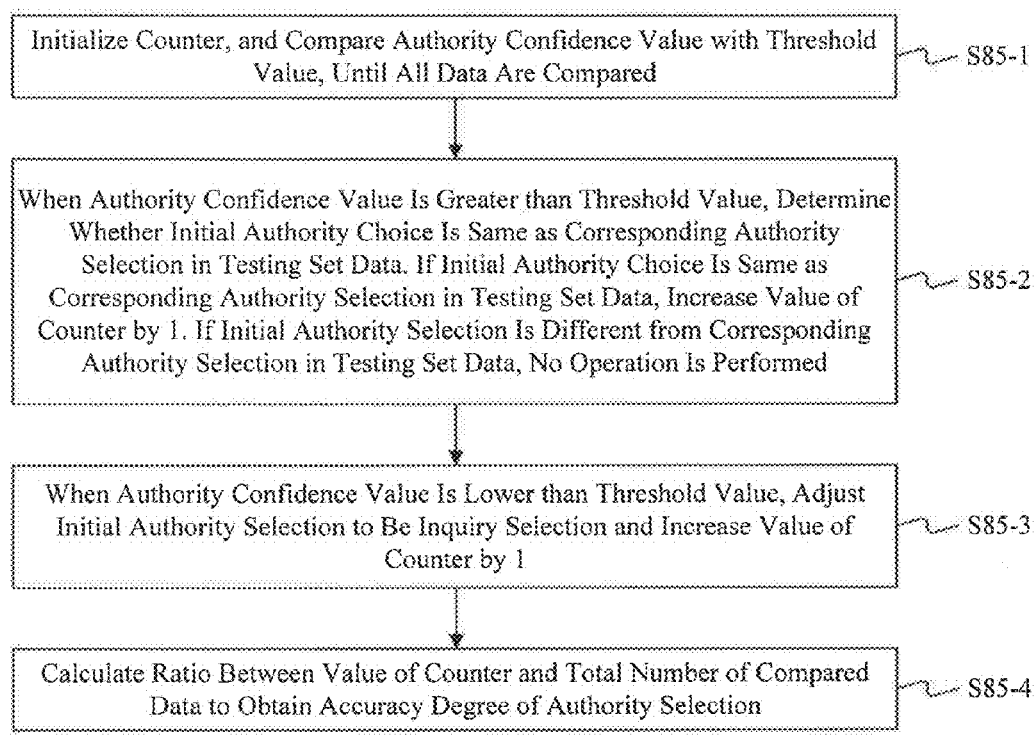
FIG. 9 is a flowchart of a method for determining an accuracy degree of an authority selection, according an exemplary embodiment.

FIG. 9 is a flowchart of a method 900 for determining accuracy degree of an authority selection, according an exemplary embodiment. As shown in FIG. 9, the method 900 includes the following steps.

In step S85-1, the server initializes a counter, and compares the authority confidence value with the threshold value, until all data are compared.

In step S85-2, when the authority confidence value is greater than the threshold value, the server determines whether the initial authority selection is the same as the corresponding authority selection in the testing set data. If the initial authority selection is the same as the corresponding authority selection in the testing set data, the value of the counter is increased by 1. If the initial authority selection is different from the corresponding authority selection in the testing set data, no operation is performed.

In step S85-3, when the authority confidence value is lower than the threshold value, the server adjusts the initial authority selection to be an inquiry selection and the value of the counter is increased by 1.

In step S85-4, the server calculates a ratio between the value of the counter and a total number of the compared data to obtain the accuracy degree of the authority selection.

Referring back to FIG. 8, in step S86, the server adjusts the initial authority selection based on the authority confidence value and the threshold value.

In some embodiments, step S86 may include the same operations of steps S44-1 to S44-3 described above in connection with FIG. 5.

In step S87, the server sends the adjusted initial authority selection and the accuracy degree of the authority selection of the corresponding application to the terminal device as the authority result, for the terminal device to determine whether to update the corresponding authority option. The authority result may include, for example, a user ID, an application name, a defined operation granted by an authority, an authority selection, and/or an accuracy degree of the authority selection. When the terminal device receives the authority result sent from the server, the terminal device may perform corresponding update. For example, in the authority result, the authority options of a mobile network, WiFi, Bluetooth, a floating window, sleeping, and system settings may be respectively turning on the mobile network, turning on WiFi, turning on Bluetooth, popping up the floating window, controlling sleeping, and modifying the system settings.

In the method 800, by calculating the accuracy degree of the authority selection, an accuracy degree of an analysis result of the authority use data may be determined, and whether to update the authority result of the user may be determined according to the accuracy degree, thereby an error rate of updating the authority may be decreased.

Figure 10:
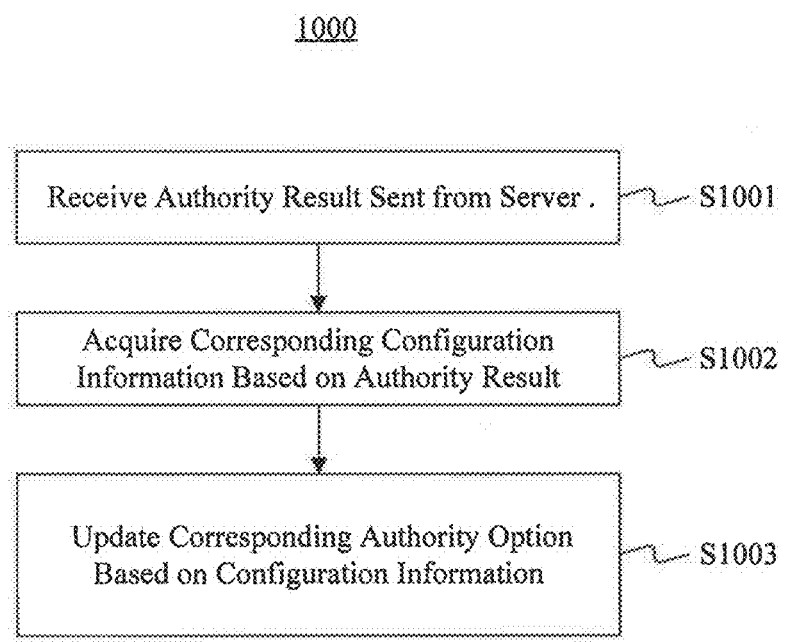
FIG. 10 is a flowchart of a method for managing an authority, according to an exemplary embodiment.

FIG. 10 is a flowchart of a method 1000 for managing an authority, according to an exemplary embodiment. For example, the method 1000 may be used in a terminal device. Referring to FIG. 10, the method 1000 includes the following steps.

In step S1001, the terminal device receives an authority result sent from a server.

The authority result may include, for example, a user ID, an application name, a defined operation granted by an authority, and/or an authority selection. The user ID) may identify the user, which may be a cell phone number, a user name of a registered user, or other contents that may identify the user, such as a Mi-Talk number. The application name refers to a program or an application with respect to which an authority option may set. The application may include applications used by the user such as Mi-Talk, WeChat and the like, applications that auto-start in a system, system programs such as Computer, On-line Neighbor and the like. The authority selection may include permission, rejection, inquiry, and/or default. For example, in SMS (Short Message Service), the defined operation granted by the authority is accessing SMS inbox. Based on statistics of records used by the user, an application may be permitted accessing SMS inbox, rejected accessing SMS inbox, or required to inquire of the user before accessing SMS inbox. For an application with respect to which no authority of accessing SMS inbox is set, records used by the data maybe classified and processed based on the authority selection, to obtain the authority result of the application of accessing SMS inbox.

In step S1002, the terminal device acquires corresponding configuration information based on the authority result. The configuration information may include, for example, type information of an authority and setting information of the corresponding authority. For example, the type of an authority may be an auto-start type, an application type, or a ROOT type. The setting of an authority may be sensitive information or description information of the authority.

Figure 11:
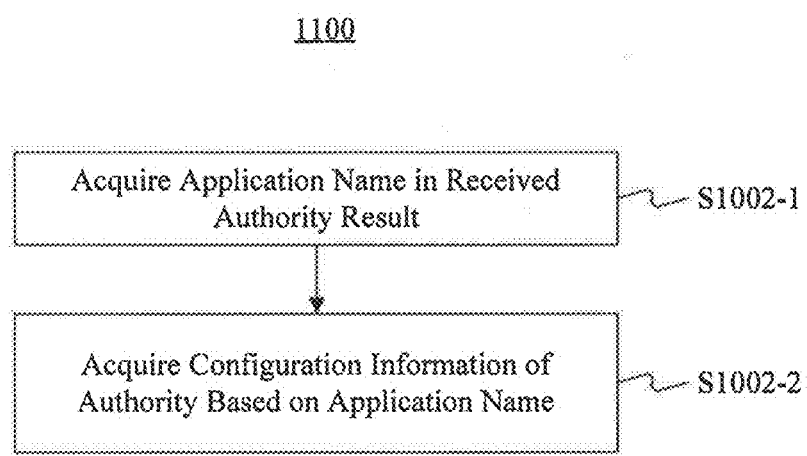
FIG. 11 is a flowchart of a method for acquiring configuration information, according to an exemplary embodiment.

In some embodiments, a corresponding authority option is updated according to the authority result. FIG. 11 is a flowchart of a method 1100 for acquiring configuration information, according to an exemplary embodiment. As shown in FIG. 11, the method 1100 includes the following steps.

In step S1002-1, the terminal device acquires an application name in the received authority result.

In some embodiments, step S1002-1 may further include acquiring a user ID in the received authority result, and when the user ID in the authority result matches a terminal user ID, acquiring the application name. When the user ID in the authority result does not match the terminal user ID, the operation may be ended.

In step S1002-2, the terminal device acquires configuration information of the authority based on the application name. The configuration information may include, for example, type information of the authority and setting information of the corresponding authority. The type of an authority may be an auto-start type, an application type or a ROOT type. The setting of an authority may be sensitive information or description information of the authority. For example, reading SMS is a sensitive authority, and the authority result is "permitting Calendar reading contents of SMS." When the authority is acquired, according to the setting information, it may prompt the user whether a checked state of "remember my choice" is required. For the sensitive information, for purpose of privacy, generally, unchecking is set by default.

In step S1003, the terminal device updates the corresponding authority option based on the configuration information corresponding to the authority.

In exemplary embodiments, the authority option is an option for the user to select an authority setting. FIG. 12a is a diagram illustrating an interface 1200a of authority options, according to an exemplary embodiment. As shown in FIG. 12a, the authority option includes: a fees related authority and a privacy related authority. For example, in accessing a contact list, the authority option may permit applications to access the contact list, refuse the applications to access the contact list, or may permit some applications to access the contact list but refusing other applications to access the contact list. FIG. 12b is a diagram illustrating an interface 1200b of authority options, according to an exemplary embodiment. As shown in FIG. 12b, the authority option includes a multimedia related authority and a settings related authority.

In the method 1100, by receiving the authority result sent from the server, the configuration information is acquired based on the authority result, and the authority option is updated based on the configuration information. In doing so, the user may avoid manually changing the authority setting, and the corresponding authority can be automatically updated in time according to latest requirements.

Figure 13:
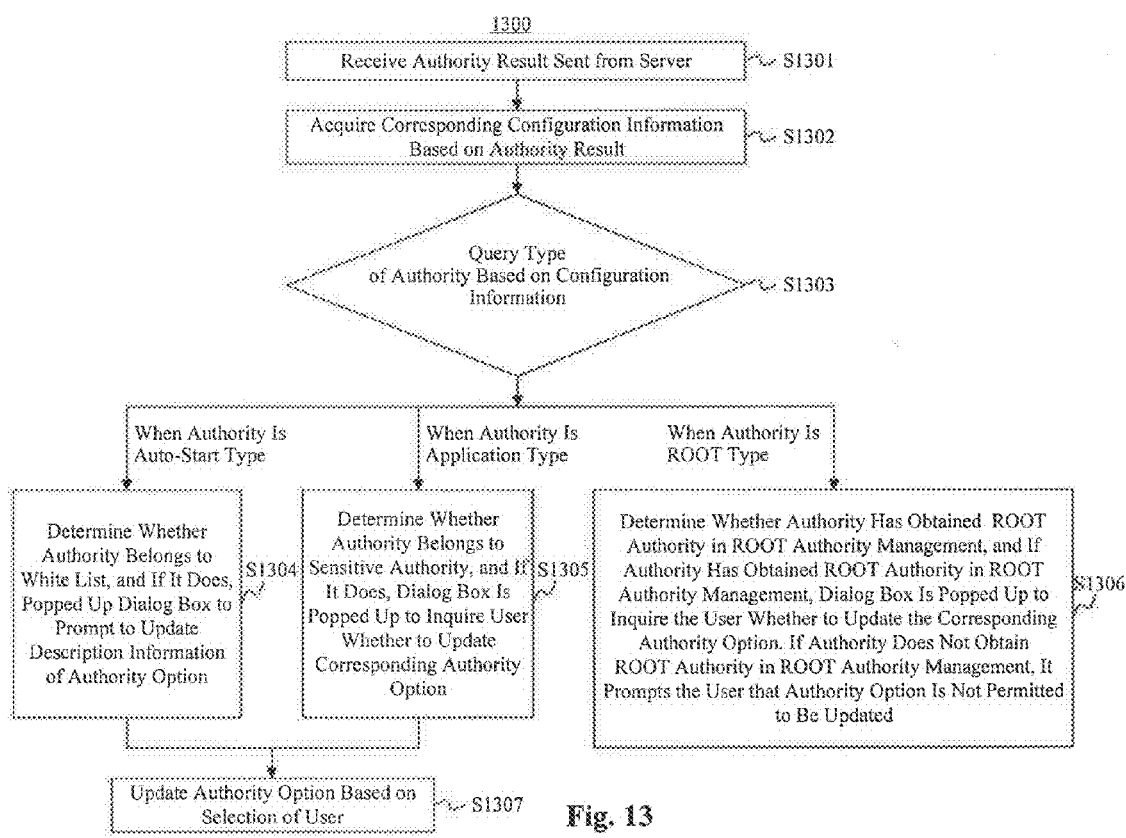
FIG. 13 is a flowchart of a method for managing an authority, according to an exemplary embodiment.

FIG. 13 is a flowchart of a method 1300 for managing an authority, according to an exemplary embodiment. For example, the method 1300 may be used in a terminal device. Referring to FIG. 13, the method 1300 includes the following steps.

In step S1301, the terminal device receives an authority result sent from a server.

The authority result may include, for example, a user ID, an application name, a defined operation granted by an authority, and/or an authority selection. The user ID may identify the user, and the application name refers to a program or an application that may set an authority, which includes applications used by the user such as Mi-Talk, WeChat and the like, applications that auto-start in a system, and system programs such as Computer, On-line Neighbor and the like. The authority selection includes, for example, permission, rejection, inquiry, and default.

In step S1302, the terminal device acquires corresponding configuration based on the authority result. The configuration information may include type information of an authority and setting information of the corresponding authority. The type of an authority may be an auto-start type, an application type, or a ROOT type. The setting of an authority may be sensitive information or description information of the authority.

In step S1303, the terminal device queries a type of the authority based on the type information in the configuration information. When the type of the authority is the auto-start type, step S1304 is performed. When the type of the authority is the application type, step S1305 is performed. When the type of the authority is the ROOT type, step S1306 is performed.

In step S1304, the terminal device determines whether the authority belongs to a white list. If it does, a dialog box is popped tip to prompt to update description information of a corresponding authority option. The white list refers to a predefined list including names of applications which may cause a window to automatically pop up to inquire of the user when the application is started for the first time.

Figure 14:
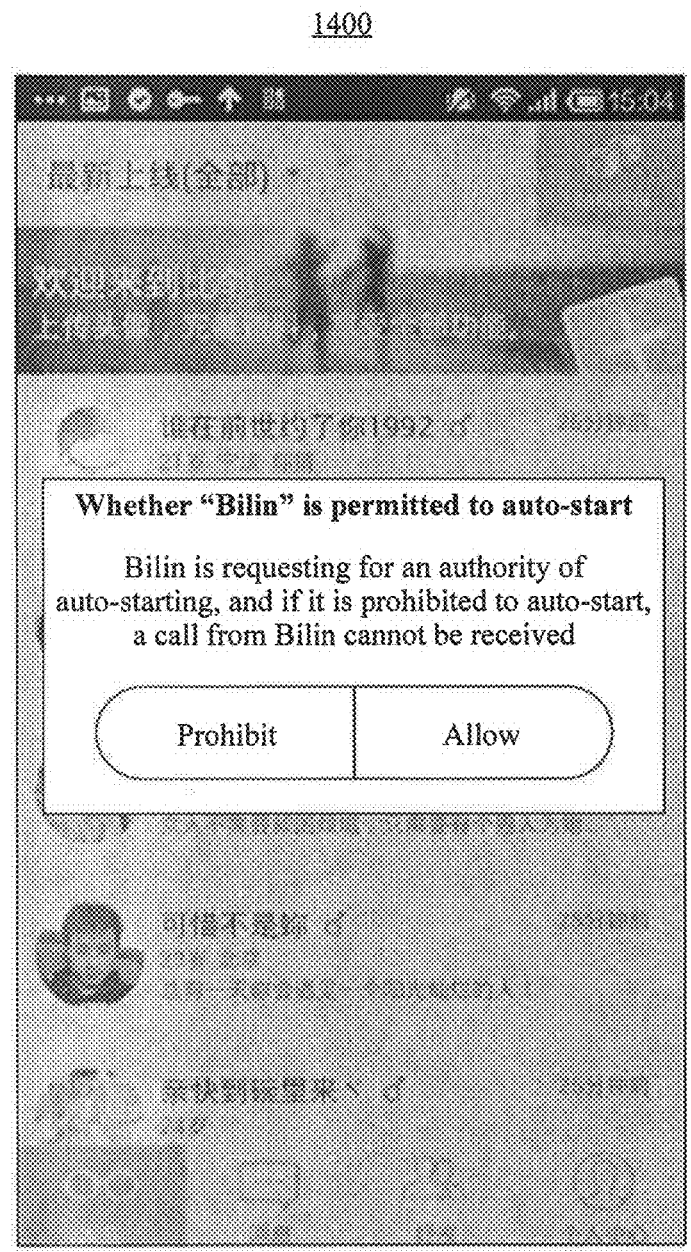
FIG. 14 is a diagram illustrating an interface of a white list application, according to an exemplary embodiment.

FIG. 14 is a diagram illustrating an interface 1400 of a white list application, according to an exemplary embodiment. As shown in FIG. 14, when the white list includes an application "Bilin", and Bilin is started for the first time, a dialog box may be popped up to prompt information whether "Bilin" is permitted to auto-start. The description information in FIG. 14 shows that: Bilin is requesting for an authority of auto-starting, and if it is prohibited to auto-start, a call from Bilin cannot be received.

Figure 15:
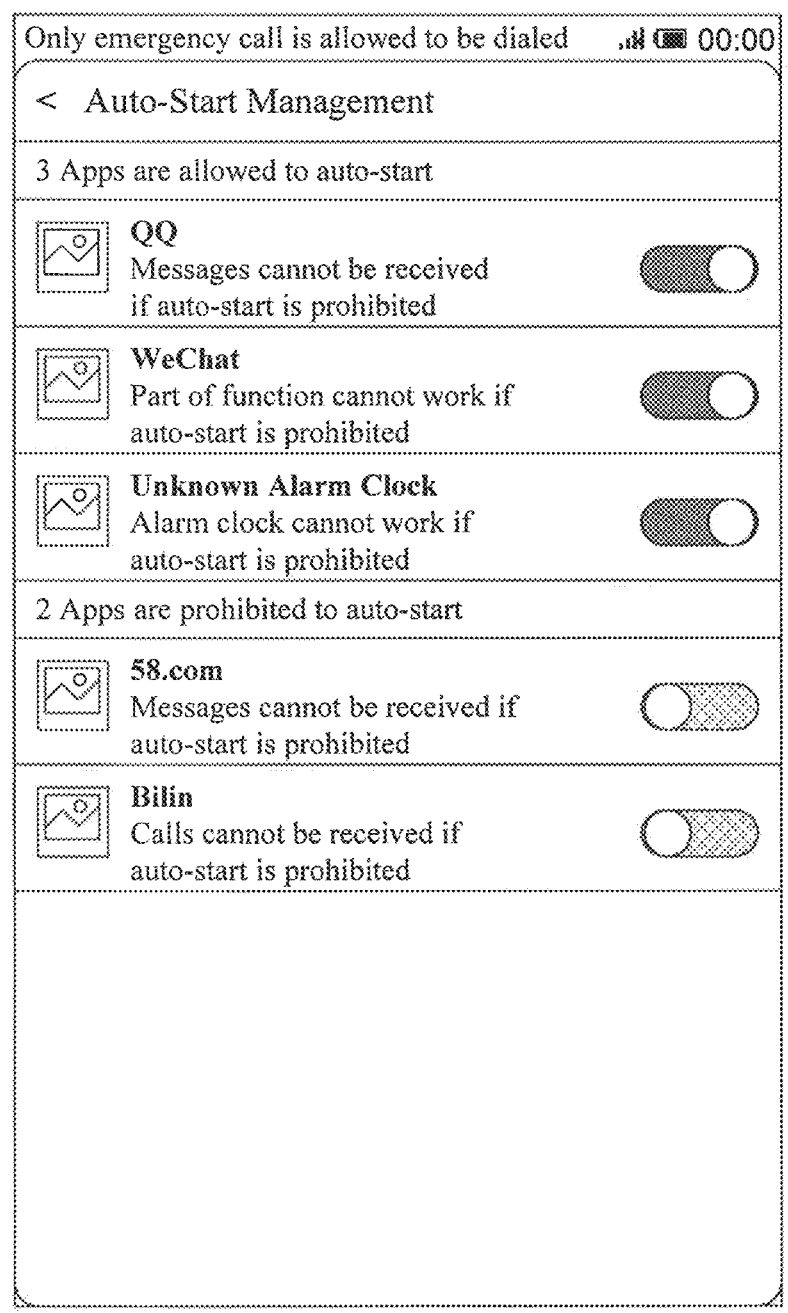
FIG. 15 is a diagram illustrating an interface of auto-start type authority management, according to an exemplary embodiment.

When the type of the authority is the auto-start type, in an auto-start management authority page, all applications may be present in one page, and controlled by switches. Additionally, after the switch is clicked, the page is not changed immediately until the page is entered next time. FIG. 15 is a diagram illustrating an interface 1500 of auto-start type authority management, according to an exemplary embodiment. As shown in FIG. 15, applications in an auto-start management page include QQ, WeChat, Unknown Alarm Clock, 58.com and Bilin. Among them, the applications that are permitted to auto-start include QQ, WeChat and Unknown Alarm Clock. The applications that are prohibited to auto-start include 58.com and Bilin. Permission or prohibition is controlled by the switch on the right, and when 58.com and Bilin are prohibited to auto-start, the page is not changed immediately until the page is entered next time.

After the step S1304 is performed, step S1307 is performed.

Figure 16:
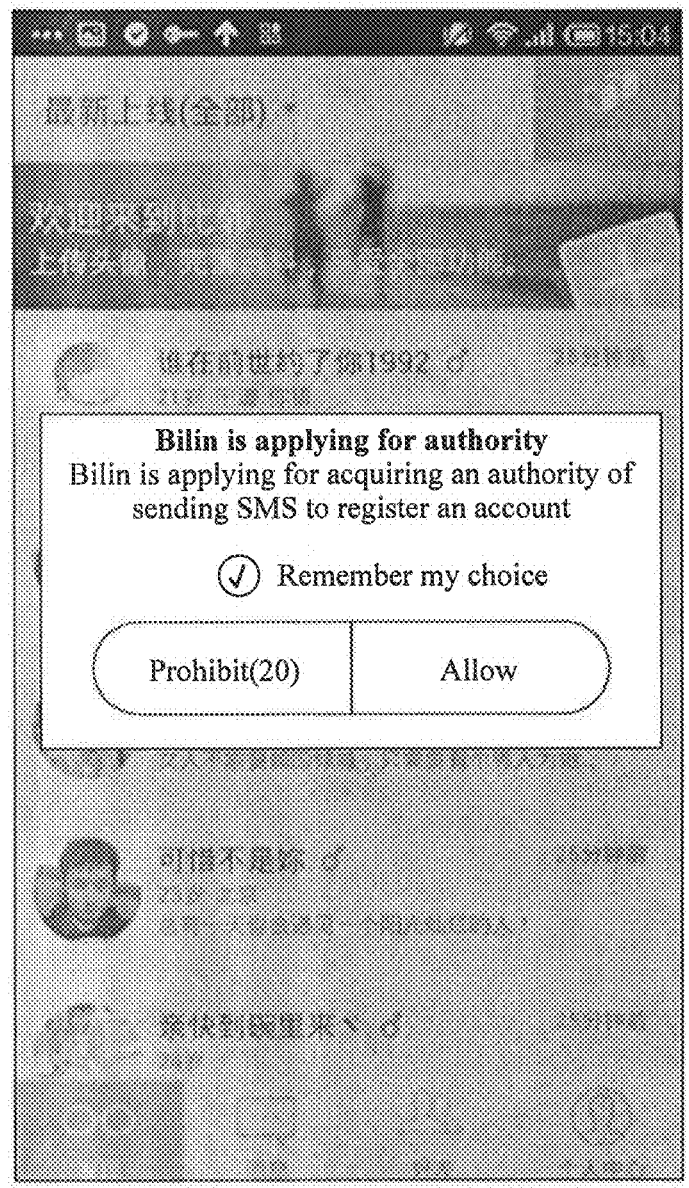
FIG. 16 is a diagram illustrating an interface of sensitive authority management, according to an exemplary embodiment.

In step S1305, the terminal device determines whether the authority belongs to a sensitive authority, and if it does, a dialog box is popped up to inquire of the user whether to update the corresponding authority option. The sensitive authority refers to authority options that involve personal privacy and information security such as a network authority, a SMS authority, and an authority of reading contacts. For instance, in a MIUI system, pop-up inquiry is carried out with respect to sensitive authorities of an application that is installed through a non-Mi channel, or an application that is not operated. FIG. 16 is a diagram illustrating an interface 1600 of sensitive authority management, according to an exemplary embodiment. As shown in FIG. 16, when "Bilin" applies for acquiring an authority of sending SMS to register an account, since the authority of "sending SMS" is the sensitive authority, a widow may be popped up to inquire whether unchecking "remember my choice" should be set by default. Additionally, sensitivity may be graded, and with respect to a general sensitive authority, a window may be popped up to enquiry whether checking "remember my choice" should be set by default, while with respect to a non-sensitive authority, permission may be set by default.

Figure 17:
FIG. 17 is a diagram illustrating an interface of authority management in an application dimension, according to an exemplary embodiment.

When the type of the authority is the application type, in an application management authority page, an application management dimension and an authority management dimension may be presented. In some embodiments, presentation in accordance with the application dimension may be set by default. FIG. 17 is a diagram illustrating an interface 1700 of authority management, according to an exemplary embodiment. In accordance with the application dimension, as shown in FIG. 17, application names are displayed in application management, detailed information of the application management may be presented by clicking right arrows on the right of the applications, which include authorities of the applications.

Figure 18:
FIG. 18 is a diagram illustrating an interface of detailed information of an application authority, according to an exemplary embodiment.

FIG. 18 is a diagram illustrating an interface 1800 of detailed information of an application authority, according to an exemplary embodiment. As shown in FIG. 18, the purpose of using the authority by the application may be indicated below the authority. A single function bar on the right can be clicked and popped up for the user to choose whether to inquire/permit/refuse. For example, in FIG. 18, the authorities of the application Weibo include sending SMS, phone call, call logs, and contacts. The purpose of using the authority of sending SMS by Weibo is indicated below the authority of sending SMS, which is for sharing to Weibo.

Figure 19:
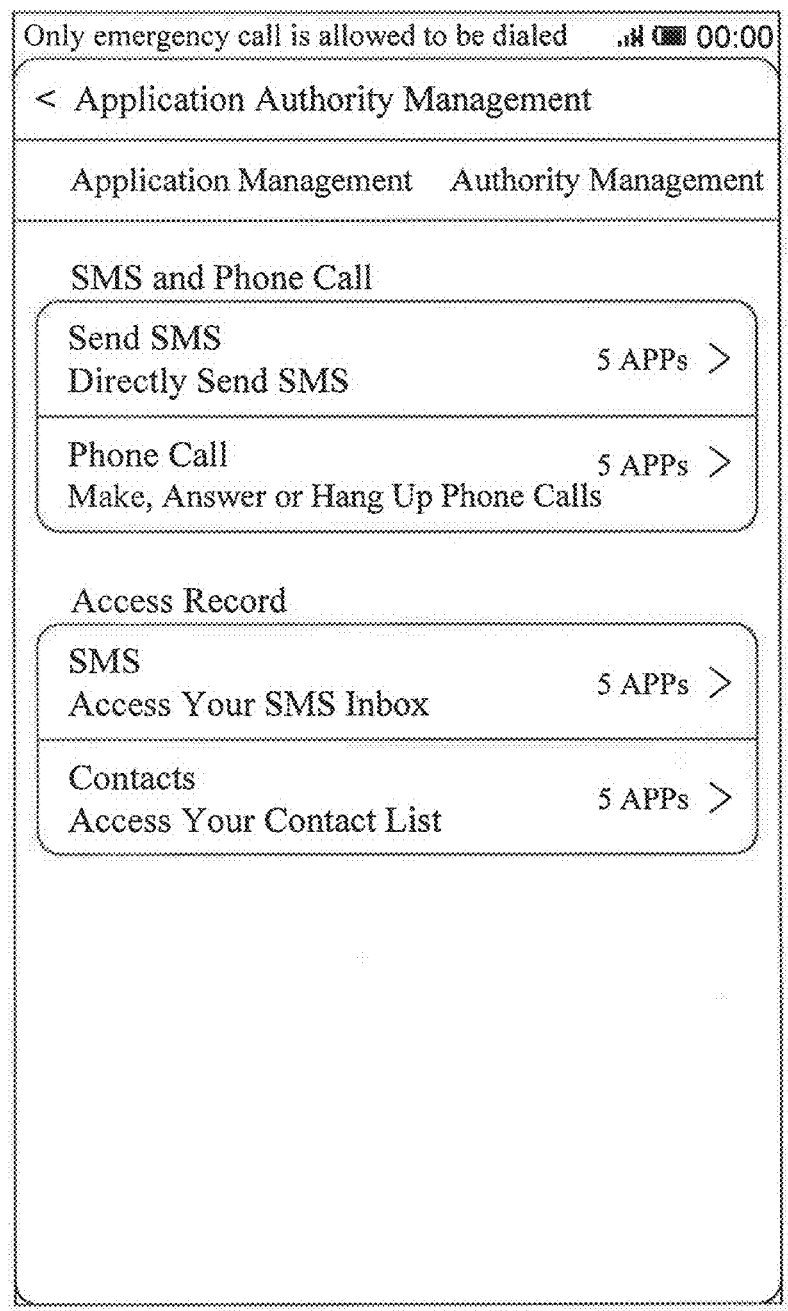
FIG. 19 is a diagram illustrating an interface of authority management in an authority dimension, according to an exemplary embodiment.
Figure 20:
FIG. 20 is a diagram of an interface of applications illustrated under management of an authority dimension, according to an exemplary embodiment.

FIG. 19 is a diagram illustrating an interface 1900 of authority management in an authority dimension, according to an exemplary embodiment. As shown in FIG. 19, when the interface is presented according to the authority dimension, the page presents all authorities and shows applications included by the authorities. For example, in FIG. 19, the authorities presented in the page include sending SMS, phone call, SMS, and contacts. As shown in FIG. 19, "5 Apps" is displayed on the right of the authority of sending SMS, and applications under the authority may be presented by clicking the right arrow on the right of the authority management. FIG. 20 is a diagram of an interface 2000 of applications illustrated under management of an authority dimension, according to an exemplary embodiment. As shown in FIG. 20, the applications under the authority of sending SMS include QQ, WeChat, Unknown Alarm Clock, 58.com and Bilin.

Referring back to FIG. 13, after the step S1305 is performed, step S1307 is performed.

In step S1306, the terminal device determines whether the authority has obtained a ROOT authority in ROOT authority management. If the authority has obtained the ROOT authority in the ROOT authority management, a dialog box is popped up to inquire of the user whether to update the corresponding authority option. If the authority does not obtain the ROOT authority in the ROOT authority management, a dialog box is popped up to prompt the user that the authority option is not permitted to be updated.

Figure 21:
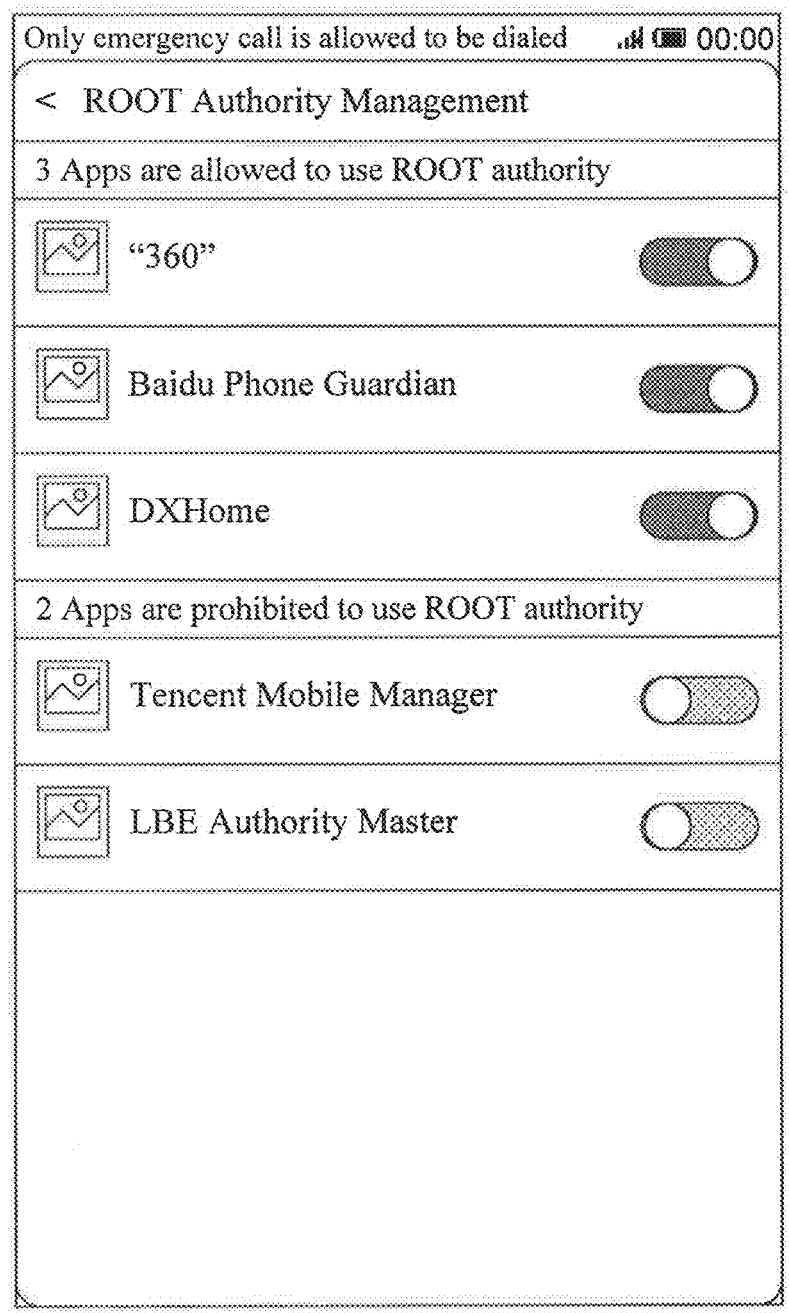
FIG. 21 is a diagram illustrating an interface of applications shown in a ROOT authority management page, according to an exemplary embodiment.
Figure 22A:
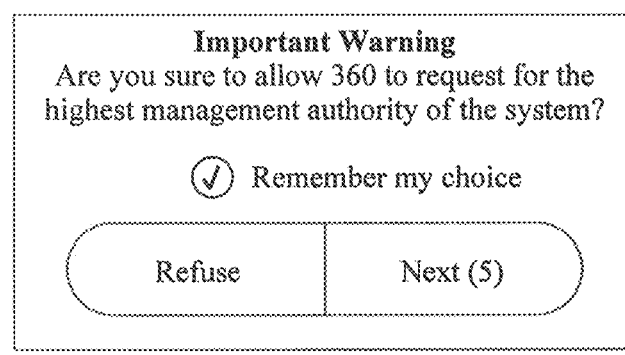
FIG. 22a is a diagram illustrating an interface for applying a ROOT authority, according to an exemplary embodiment.
Figure 22B:
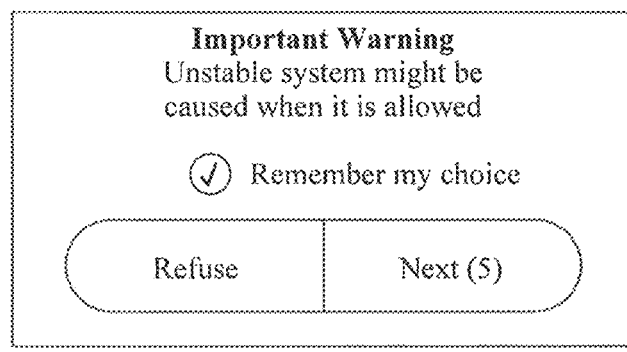
FIG. 22b is a diagram illustrating an interface for applying a ROOT authority, according to an exemplary embodiment.
Figure 22C:
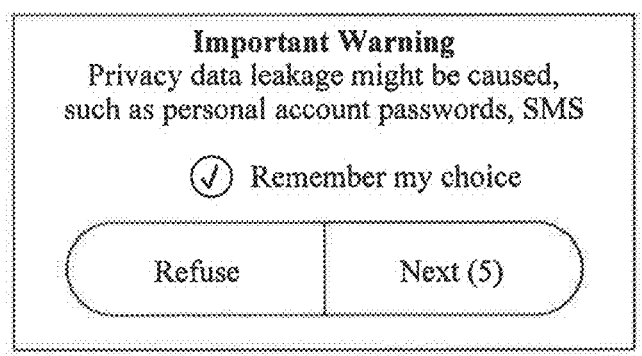
FIG. 22c is a diagram illustrating an interface for applying a ROOT authority, according to an exemplary embodiment.
Figure 22D:
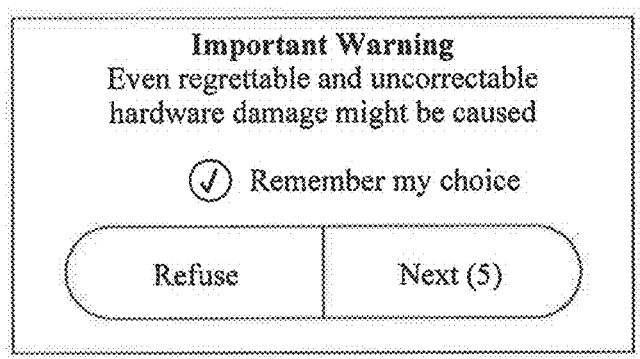
FIG. 22d is a diagram illustrating an interface for applying a ROOT authority, according to an exemplary embodiment.
Figure 22E:
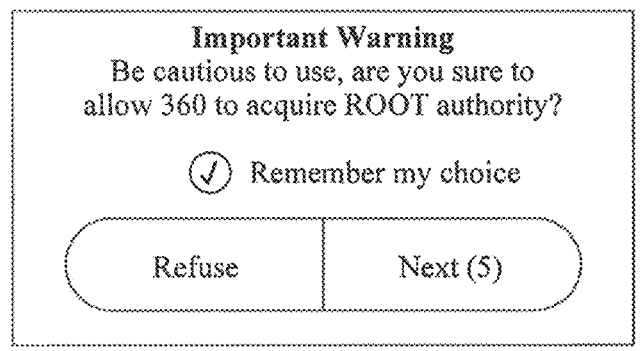
FIG. 22e is a diagram illustrating an interface for applying a ROOT authority, according to an exemplary embodiment.
Figure 23:
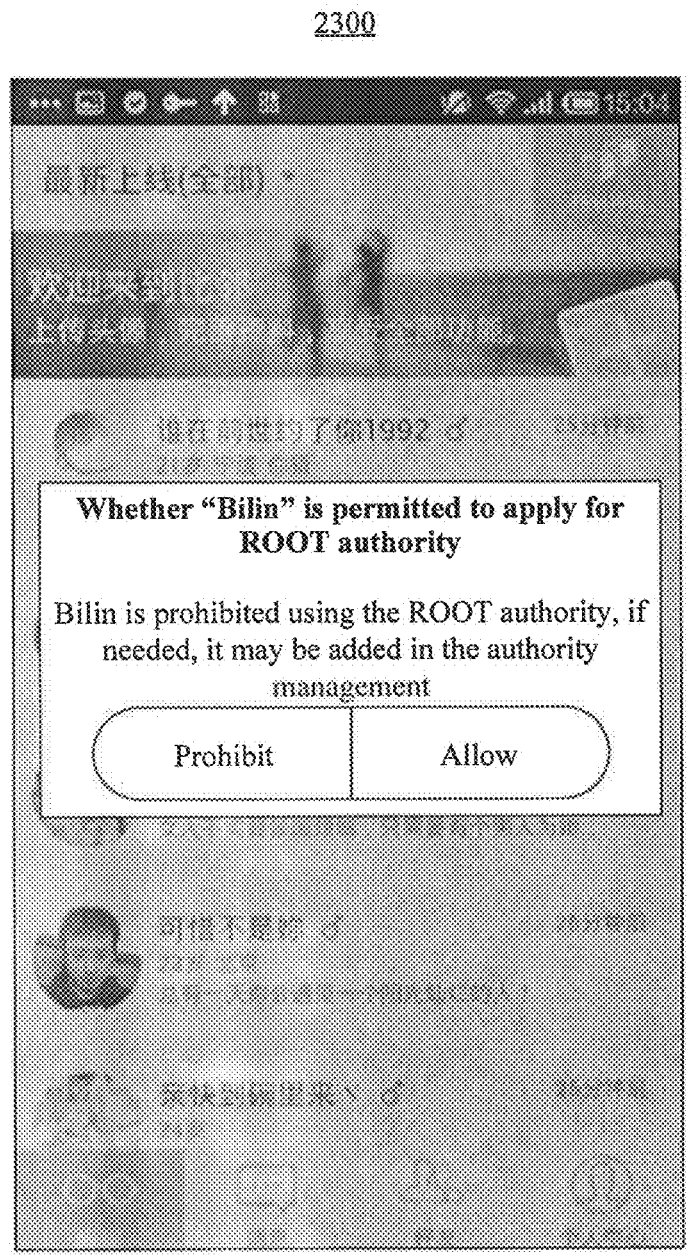
FIG. 23 is a diagram illustrating an interface of an application in ROOT authority management, according to an exemplary embodiment.

In some embodiments, when the type of the authority is the ROOT type, the ROOT authority may be modified in a ROOT authority management page. For example, only applications that have applied for the ROOT authority are presented in the ROOT authority management page, and it is default that the authority setting is set to be off. FIG. 21 is a diagram illustrating an interface 2100 of applications shown in a ROOT authority management page, according to an exemplary embodiment. As shown in FIG. 21, in the ROOT authority management page, the applications include "360", Baidu Phone Guardian, DXHome, Tencent Mobile Manger and LBE authority Master. If an off-switch is clicked, the ROOT authority of the application may be turned off immediately, and if an on-switch is clicked, a confirmation pop-up window is presented. Five steps of prompts for applying for the ROOT authority 2200a-2200e are shown in FIGS. 22a to 22e. If a third party application applies for the ROOT authority in its application, the user is prompted by a pop-up window that the application is prohibited using the ROOT authority. FIG. 23 is a diagram illustrating an interface 2300 of an application in ROOT authority management, according to an exemplary embodiment. As shown in FIG. 23, when Bilin applies for the ROOT authority within its application, prompt information "Bilin is prohibited using the ROOT authority, if needed, it may be added in the authority management" is displayed.

Referring back to FIG. 13, in step S1307, the terminal device updates the authority option according to a selection of the user. For example, in the example in FIG. 16, when "Bilin" applies for acquiring the authority of sending SMS to register an account, there are two selections of "permission" and "rejection" in the interface, and when the user chooses "permission", according to the selection of the user, the authority option of acquiring the authority of sending SMS for "Bilin" is updated. Additionally, "remember my choice" may also be checked.

In the method 1300, by receiving the authority result sent from the server, the configuration information is acquired according to the authority result, and according to the type information and the setting information in the configuration information, a corresponding operation for updating the authority is adopted. By prompt of a white list, it may be brought to the user's attention that a particular function cannot be performed normally when a corresponding application does not auto-start. By setting the sensitive authority, the terminal device may alert the user a function of the authority of the application, such that the user makes an informed choice as to whether to grant authority.

Figure 24:
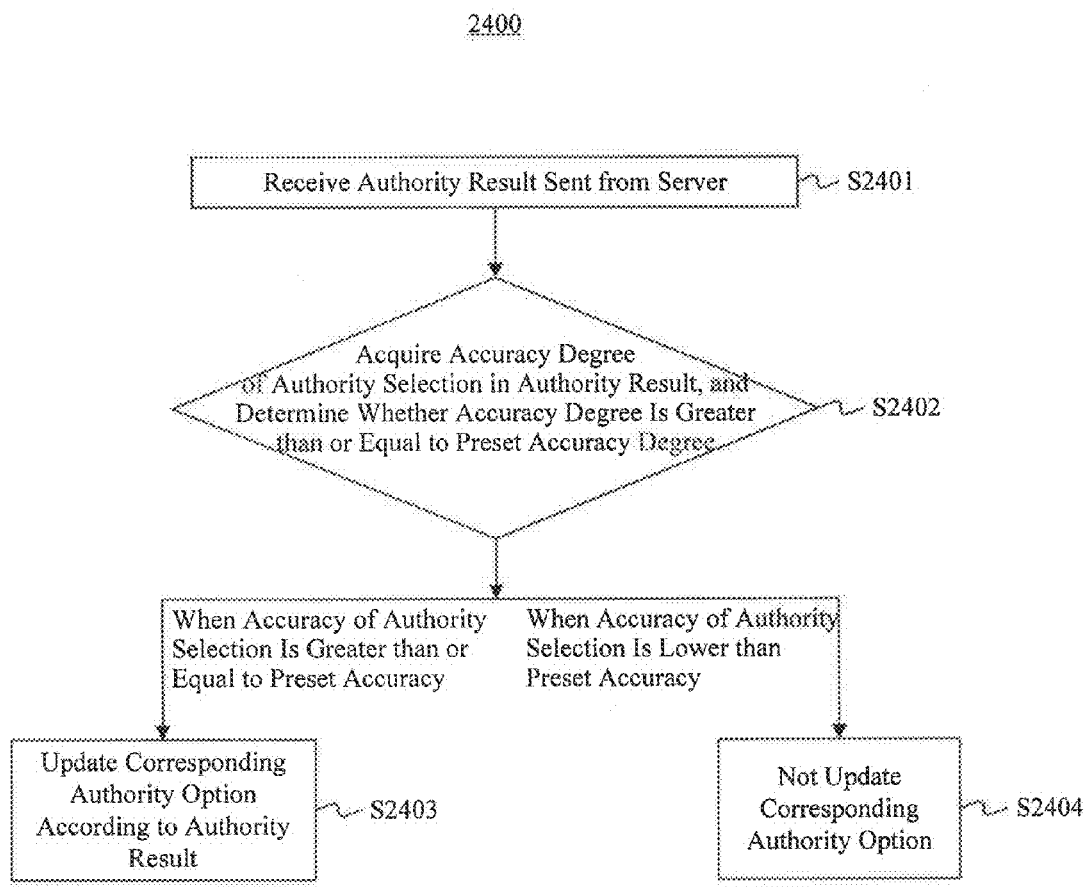
FIG. 24 is a flowchart of a method for managing an authority, according to an exemplary embodiment.

FIG. 24 is a flowchart of a method 2400 for managing an authority, according to an exemplary embodiment. For example, the method 2400 may be used in a terminal device. Referring to FIG. 24, the method 2400 includes the following steps.

In step S2401, the terminal device receives an authority result sent from a server.

The authority result may include, for example, a user ID, an application name, a defined operation granted by an authority, an authority selection, and an accuracy degree of the authority selection. The user ID may be used for identifying the user, which may be a cell phone number, a user name of a registered user, or other contents that may identify the user such as a Mi-Talk number. The application name refers to a program or an application that may set an authority, which includes applications used by the user such as Mi-Talk, WeChat and the like, applications that auto-start in a system, system programs such as Computer, On-line Neighbor and the like. The authority selection may include permission, rejection, inquiry and default. For example, in SMS (Short Message Service), the defined operation granted by the authority is accessing SMS inbox. The authority can be granted based on statistics of use records by the user. An application may be permitted accessing SMS inbox, rejected accessing SMS inbox, or required to enquiry the user before accessing SMS inbox. If no authority of accessing SMS inbox is set for an application, an authority result of the application of accessing SMS inbox may be obtained by classifying and processing the application based on the authority selection.

In step S2402, the terminal device acquires an accuracy degree of the authority selection in the authority result, and determines whether the accuracy degree of the authority selection is greater than a preset accuracy degree. When the accuracy degree of the authority selection is greater than the preset accuracy degree, step S2403 is performed. When the accuracy of the authority selection is lower than the preset accuracy, the terminal device does not update the corresponding authority option.

The preset accuracy degree may be preset according to accuracy requirements of the system. For example, when the preset accuracy degree is 90%, and the accuracy degree of the authority selection is lower than 90%, the corresponding authority option is not updated.

In step S2403, the terminal device updates the corresponding authority option according to the authority result.

In one exemplary embodiment, the procedure for updating the corresponding authority option according to the authority result may include steps S1302-S1307 described above in connection with FIG. 13.

In some embodiments, after the updating the corresponding authority option according to the authority result, the method 2400 may further include obtaining the authority use data of the user according to the updated authority option; and returning the authority use data of the user to the server, for the server to upload the authority use data of the user to a cloud.

In the method 2400, by determining whether to update the authority result of the user based on the accuracy degree, an error rate of incorrectly updating the authority may be decreased.

Figure 25:
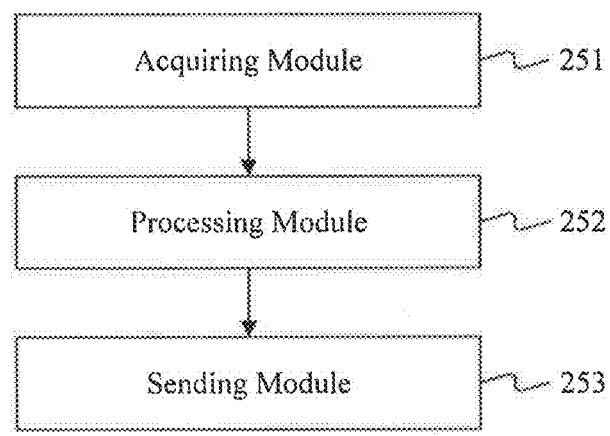
FIG. 25 is a block diagram of a device for managing an authority, according to an exemplary embodiment.

FIG. 25 is a block diagram of a device 2500 for managing an authority, according to an exemplary embodiment. Referring to FIG. 25, the device 2500 may include an acquiring module 251, a processing module 252 and a sending module 253.

The acquiring module 251 is configured to acquire authority use data of a user.

The processing module 252 is configured to process the authority use data to obtain an authority result.

The sending module 253 is configured to send the authority result obtained by the processing to a terminal device, for the terminal device to update a corresponding authority option.

Figure 26:
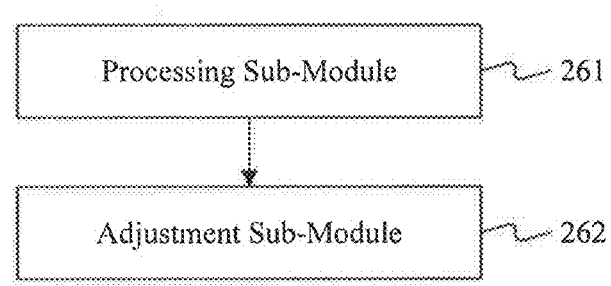
FIG. 26 is a block diagram of a processing module, according to an exemplary embodiment.

FIG. 26 is a block diagram of the processing module 252 (FIG. 25), according to an exemplary embodiment. Referring to FIG. 26, the processing module 252 includes a processing sub-module 261 and an adjustment sub-module 262.

The processing sub-module 261 is configured to process the authority use data based on an authority selection, to obtain an authority confidence value and an initial authority selection.

The adjustment sub-module 262 is configured to adjust the initial authority selection based on the authority confidence value and a threshold value, to obtain the authority result.

Figure 27:
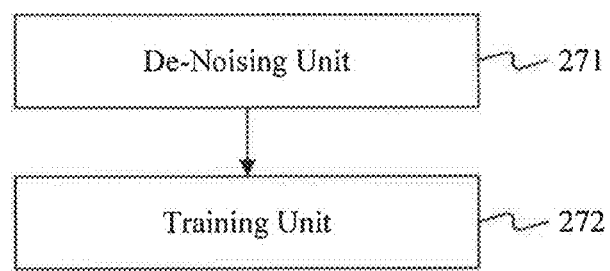
FIG. 27 is a block diagram of a processing sub-module, according to an exemplary embodiment.

FIG. 27 is a block diagram of the processing sub-module 261 (FIG. 26), according to an exemplary embodiment. Referring to FIG. 27, the processing sub-module 261 may include a de-noising unit 271 and a training unit 272.

The de-noising unit 271 is configured to perform de-noising processing on the authority use data.

The training unit 272 is configured to perform a SVM training on the de-noised authority use data based on the authority selection of permission and rejection, to obtain the authority confidence value and the initial authority selection of the corresponding authority option.

Figure 28:
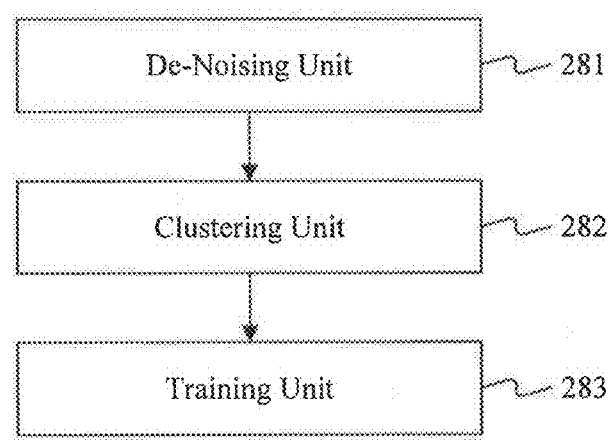
FIG. 28 is a diagram of a processing sub-module, according to an exemplary embodiment.

FIG. 28 is a diagram of the processing sub-module 261 (FIG. 26), according to an exemplary embodiment. Referring to FIG. 28, the processing sub-module 261 may include a de-noising unit 281, a clustering unit 282, and a training unit 283.

The de-noising unit 281 is configured to perform de-noising processing on the authority use data.

The clustering unit 282 is configured to perform cluster analysis on the authority use data with respect to the user based on a cluster algorithm, to obtain a cluster type of the user.

The training unit 283 is configured to, based on the cluster type of the user, perform a SVM training on each type of the user respectively based on the authority selection of permission or rejection in the authority option, to obtain the authority confidence value and the initial authority selection corresponding to the authority option.

Figure 29:
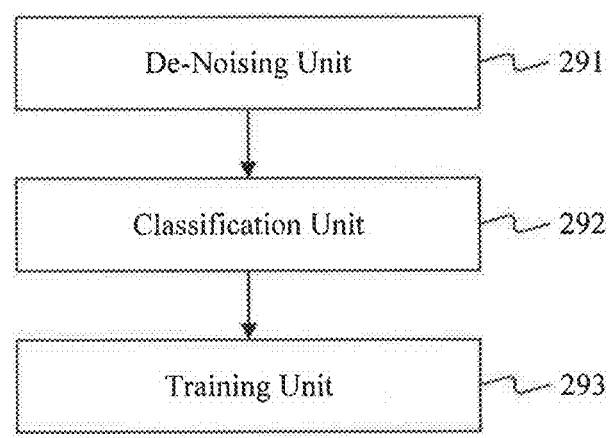
FIG. 29 is a block diagram of a processing sub-module, according to an exemplary embodiment.

FIG. 29 is a block diagram of the processing sub-module 261 (FIG. 26), according to an exemplary embodiment. Referring to FIG. 29, the processing sub-module 261 may include a de-noising unit 291, a classification unit 292, and a training unit 293.

The de-noising unit 291 is configured to perform de-noising processing on the authority use data.

The classification unit 292 is configured to classify the de-noised authority use data into training set data and testing set data based on a classification ratio.

The training unit 293 is configured to perform a SVM training on the training set data respectively based on the authority selection of permission or rejection in the authority option, to obtain the initial authority selection and the authority confidence value corresponding to the authority option.

In some embodiments, the device 2500 (FIG. 25) may further include a determination module configured to determine accuracy of the initial authority selection based on the testing set data, to obtain an accuracy degree of the authority selection.

Figure 30:
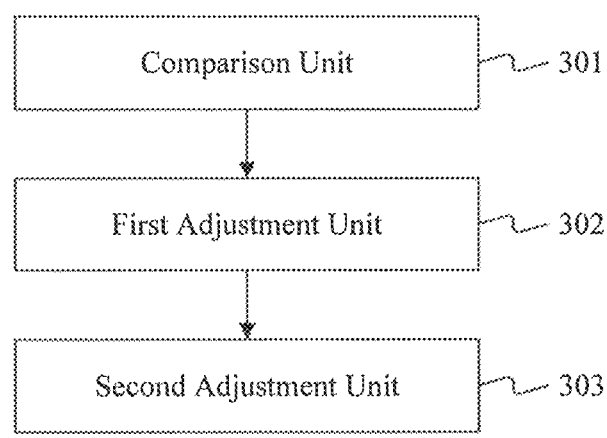
FIG. 30 is a block diagram of an adjustment sub-module, according to an exemplary embodiment.

FIG. 30 is a block diagram of the adjustment sub-module 262 (FIG. 26), according to an exemplary embodiment. Referring to FIG. 30, the adjustment sub-module 262 may include a comparison unit 301, a first adjustment unit 302, and a second adjustment unit 303.

The comparison unit 301 is configured to compare the authority confidence value corresponding to the authority option with a threshold value.

The first adjustment unit 302 is configured to, when the authority confidence value is lower than the threshold value, adjust the initial authority selection to be an inquiry selection as the authority result.

The second adjustment unit 303 is configured to, when the authority confidence value is greater than or equal to the threshold value, use the initial authority selection as the authority result.

Figure 31:
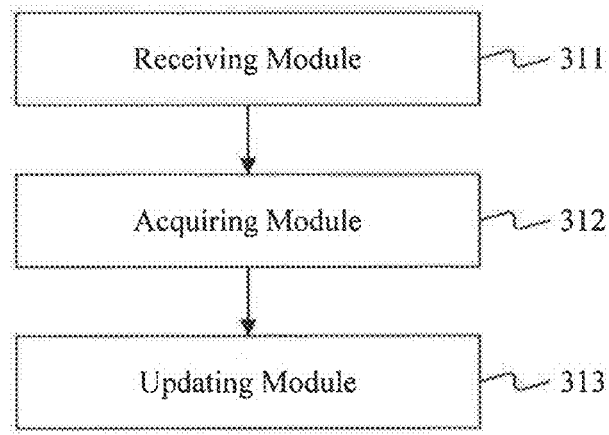
FIG. 31 is a block diagram of a device for managing an authority, according to an exemplary embodiment.

FIG. 31 is a block diagram of a device 3100 for managing an authority, according to an exemplary embodiment. Referring to FIG. 31, the device may include a receiving module 311, an acquiring module 312, and an updating module 313.

The receiving module 311 is configured to receive an authority result sent from a server.

The acquiring module 312 is configured to acquire configuration information of a corresponding authority based on the authority result.

The updating module 313 is configured to update a corresponding authority option based on the configuration information corresponding to the current authority.

Figure 32:
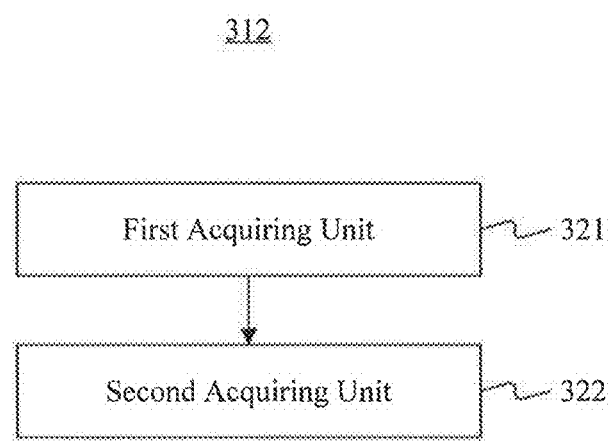
FIG. 32 is a block diagram of an acquiring module, according to an exemplary embodiment.

FIG. 32 is a block diagram of the acquiring module 312 (FIG. 31), according to an exemplary embodiment. Referring to FIG. 32, the acquiring module 312 may include a first acquiring unit 321 and a second acquiring unit 322.

The first acquiring unit 321 is configured to acquire an application name in the received authority result.

The second acquiring unit 322 is configured to acquire the configuration information of the authority based on the application name.

Figure 33:
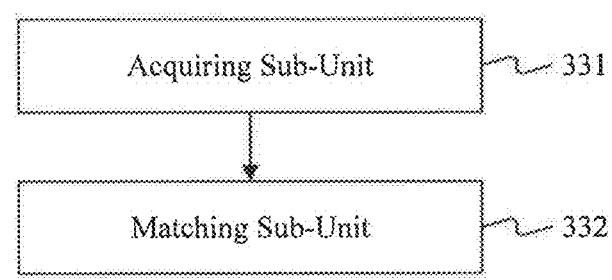
FIG. 33 is a block diagram of an acquiring unit, according to an exemplary embodiment.

FIG. 33 is a block diagram of the first acquiring unit 321 (FIG. 32), according to an exemplary embodiment. Referring to FIG. 33, the first acquiring unit 321 includes an acquiring sub-unit 331 and a matching sub-unit 332.

The acquiring subunit 331 is configured to acquire a user ID in the received authority result.

The matching subunit 332 is configured to, when the user ID in the authority result matches a terminal user ID, acquire the application name.

Figure 34:
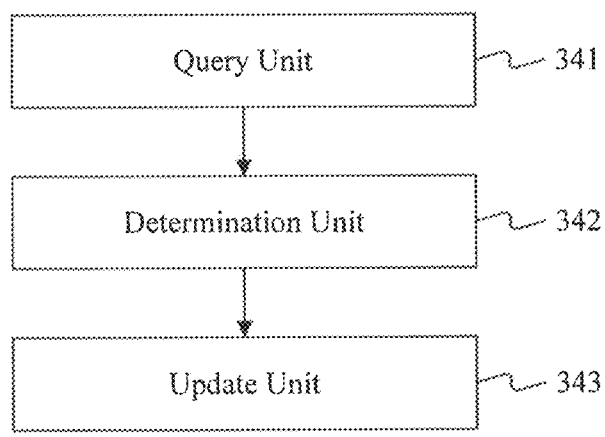
FIG. 34 is a block diagram of an updating module, according to an exemplary embodiment.

FIG. 34 is a block diagram of the updating module 313 (FIG. 31), according to an exemplary embodiment. Referring to FIG. 34, the updating module 313 may include a query unit 341, a determination unit 342, and an update unit 343.

The query unit 341 is configured to query a type of an authority, based on the type information in the configuration information.

The determination unit 342 is configured to, when the authority is an auto-start type, determine whether the authority belongs to a white list, and if it does, pop up a dialog box to prompt to update description information of the corresponding authority option.

The update unit 343 is configured to update the authority option according to a selection of the user.

Figure 35:
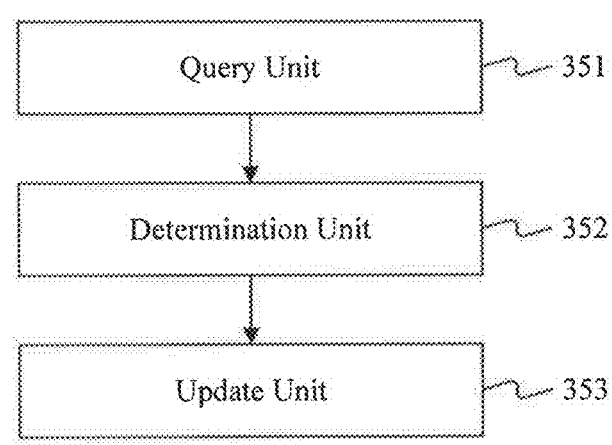
FIG. 35 is a block diagram of an updating module, according to an exemplary embodiment.

FIG. 35 is a block diagram of the updating module 313 (FIG. 31), according to an exemplary embodiment. Referring to FIG. 35, the updating module 313 may include a query unit 351, a determination unit 352, and an update unit 353.

The query unit 351 is configured to query a type of the authority, based on type information in the configuration information.

The determination unit 352 is configured to, when the authority is an application type, determine whether the authority belongs to a sensitive authority, and if it does, pop up a dialog box to inquire of the user whether to update the corresponding authority option.

The update unit 353 is configured to update the authority option according to a selection of the user.

Figure 36:
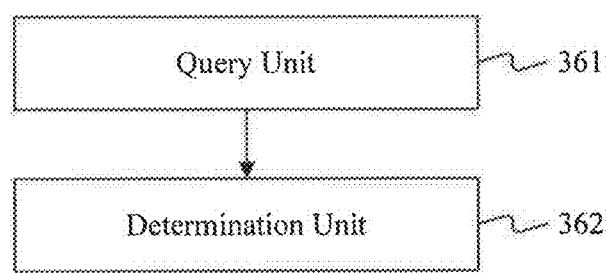
FIG. 36 is a block diagram of an updating module, according to an exemplary embodiment.

FIG. 36 is a block diagram of the updating module 313 (FIG. 31), according to an exemplary embodiment. Referring to FIG. 36, the update module 313 may include a query unit 361 and a determination unit 362.

The query unit 361 is configured to query a type of the authority, based on type information in the configuration information.

The determination unit 362 is configured to, when a type of the authority is a ROOT type, determine whether the authority has obtained a ROOT authority in ROOT authority management, and if the current authority has obtained the ROOT authority in the ROOT authority management, pop up a dialog box to inquire of the user whether to update the corresponding authority option. If the current authority does not obtain the ROOT authority in the ROOT authority management, the determination unit 362 is configured to prompt the user that the authority option is not permitted to be updated.

In exemplary embodiments, the device 3100 (FIG. 31) further includes a determination module configured to acquire an accuracy of the authority selection in the authority result received from the server, determine whether the accuracy of the authority selection is greater than a preset accuracy, and when the accuracy of the authority selection is greater than the preset accuracy, update the corresponding authority option by the update module according to the authority result, and when the accuracy of the authority selection is smaller than the preset accuracy, not update the corresponding authority option.

In exemplary embodiments, the device 3100 may further include a returning module configure to, according to the updated authority option, send the updated authority use data of the user to the server, for the server to upload the authority use data of the user to a cloud.

With respect to the devices and the system in the above embodiments, the specific manners for performing operations for respective modules therein have been described in detail in the embodiments with regard to the methods for managing an authority.

Figure 37:
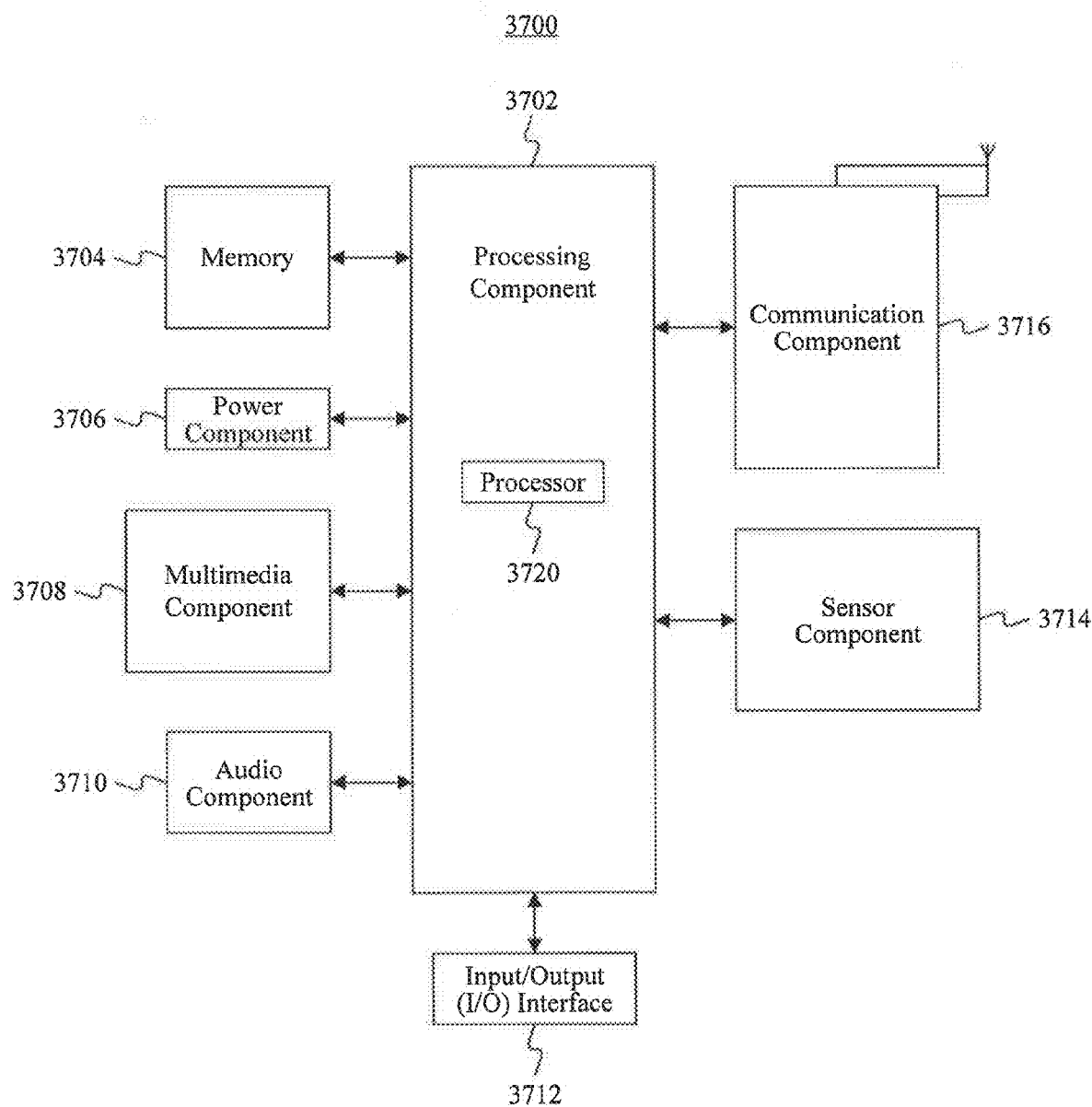
FIG. 37 is a block diagram of a terminal device, according to an exemplary embodiment.

FIG. 37 is a block diagram of a terminal device 3700 for managing an authority, according to an exemplary embodiment. For example, the terminal device 3700 may be a mobile phone, a computer, a digital broadcast terminal, a messaging device, a gaming console, a tablet, a medical device, exercise equipment, a personal digital assistant and/or the like.

Referring to FIG. 37, the terminal device 3700 may include one or more of the following components: a processing component 3702, a memory 3704, a power component 3706, a multimedia component 3708, an audio component 3710, an input/output (I/O) interface 3712, a sensor component 3714, and a communication component 3716. The person skilled in the art should appreciate that the structure of the terminal device 3700 as shown in FIG. 37 does not intend to limit the terminal device 3700. The terminal device 3700 may include more or less components or combine some components or other different components.

The processing component 3702 usually controls overall operations of the terminal device 3700, such as operations associated with display, telephone calls, data communications, camera operations and recording operations. The processing component 3702 may include one or more processors 3720 to execute instructions to perform all or a part of the steps in the above described methods. Moreover, the processing component 3702 may include one or more modules which facilitate the interaction between the processing component 3702 and other components. For instance, the processing component 3702 may include a multimedia module to facilitate the interaction between the multimedia component 3708 and the processing component 3702.

The memory 3704 is configured to store various types of data to support the operation of the terminal device 3700. Examples of such data include instructions for any application or method operated on the terminal device 3700, contact data, phonebook data, messages, pictures, videos, etc. The memory 3704 is also configured to store programs and modules. The processing component 3702 performs various functions and data processing by operating programs and modules stored in the memory 3704. The memory 3704 may be implemented by any type of volatile or non-volatile memory device or combination thereof such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 3706 is configured to provide power to various components of the terminal device 3700. The power component 3706 may include a power management system, one or more power sources, and other components associated with the generation, management, and distribution of power in the terminal device 3700.

The multimedia component 3708 includes a screen for providing an output interface between the terminal device 3700 and the user. In some embodiments, the screen may include a liquid crystal display (LCD) and/or a touch panel (TP). If the screen includes the touch panel, the screen may be implemented as a touch screen to receive input signals from the user. The touch panel includes one or more touch sensors to sense touches, slips, and gestures performed on the touch panel. The touch sensors may not only sense a boundary of a touch or slip action, but also sense a period of time and a pressure associated with the touch or slip action. In some embodiments, the multimedia component 3708 includes a front camera and/or a rear camera. The front camera and/or the rear camera may receive external multimedia data while the terminal device 3700 is in an operation mode, such as a photographing mode or a video mode. Each of the front camera and the rear camera may be a fixed optical lens system or have focus and optical zoom capability.

The audio component 3710 is configured to output and/or input audio signals. For example, the audio component 3710 includes a microphone configured to receive an external audio signal when the terminal device 3700 is in an operation mode, such as a call mode, a recording mode, and/or a voice recognition mode. The received audio signal may be further stored in the memory 3704 or transmitted via the communication component 3716. In some embodiments, the audio component 3710 further includes a speaker to output audio signals.

The I/O interface 3712 provides an interface between the processing component 3702 and peripheral interface modules, such as a keyboard, a click wheel, a button, and the like. The button may include, but not limited to: a home button, a volume button, a starting button and a locking button.

The sensor component 3714 includes one or more sensors to provide status assessments of various aspects of the terminal device 3700. For instance, the sensor component 3714 may detect an on/off status of the terminal device 3700, relative position of components, e.g., the display and the keyboard, of the device 3700, a change in position of the terminal device 3700 or a component of the terminal device 3700, a presence or absence of an user contact with the terminal device 3700, an orientation or an acceleration/deceleration of the terminal device 3700, and/or a change in temperature of the terminal device 3700. The sensor component 3714 may include a proximity sensor configured to detect the presence of nearby objects without any physical contact. The sensor component 3714 may further include a light sensor, such as a CMOS or CCD image sensor, for use in imaging applications. In some embodiments, the sensor component 3714 may further include an accelerometer sensor, a gyroscope sensor, a magnetic sensor, a pressure sensor, or a temperature sensor.

The communication component 3716 is configured to facilitate communication, in a wire or wireless manner, between the terminal device 3700 and other devices. The terminal device 3700 can access a wireless network based on a communication standard, such as WiFi, 20 or 30, or a combination thereof. In one exemplary embodiment, the communication component 3716 receives a broadcast signal or information from an external broadcast management system via a broadcast channel. In one exemplary embodiment, the communication component 3716 further includes a near field communication (NFC) module to facilitate short-range communications. For example, the NFC module may be implemented based on a radio frequency identification (RFID) technology, an infrared data association (IrDA) technology, an ultra-bandwidth (UWB) technology, a Bluetooth (BT) technology, and/or other technologies.

In exemplary embodiments, the terminal device 3700 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, for performing the above described methods.

In exemplary embodiments, there further provides a non-transitory computer readable storage medium including instructions, such as included in the memory 3704, executable by the processor 3720 in the terminal device 3700, for performing the above described methods. For example, the non-transitory computer-readable storage medium may be a ROM, a random access memory (RAM), a CD-ROM, a magnetic tape, a floppy disc, an optical data storage device and the like.

Figure 38:
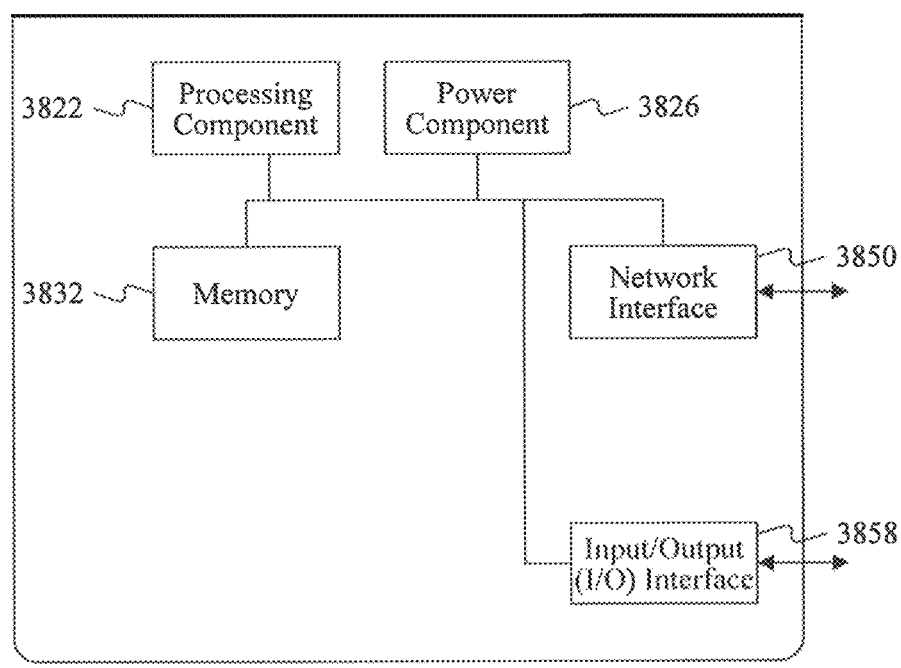
FIG. 38 is a block diagram of a device, according to an exemplary embodiment.

FIG. 38 is a block diagram illustrating a device 3800 for managing an authority, according to an exemplary embodiment. For example, the device 3800 may be provided as a server to perform the above described methods for managing an authority. Referring to FIG. 38, the device 3800 includes a processing component 3822 that further includes one or more processors, and memory resources represented by a memory 3832 for storing instructions executable by the processing component 3822, such as application programs. The application programs stored in the memory 3832 may include one or more modules each corresponding to a set of instructions.

The device 3800 may further include one power component 3826 configured to perform power management of the device 3800, one wired or wireless network interface 3850 configured to connect the device 3800 to a network, and one input/output (I/O) interface 3858. The device 3800 may operate based on an operating system stored in the memory 3832, such as Windows Server™, Mac OS X™, Unix™, Linux™, FreeBSD™, or the like.

It should be understood by those skilled in the art that the above described methods, devices, and modules/units can each be implemented through hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. The description and embodiments are only exemplary, and a true scope and spirit of the invention being indicated by the following claims.

It should be understood that the present disclosure is not limited to the exact structures that are described above and shown in the accompanying drawings, and may be modified and changed without departing from the range of the present disclosure. The scope of the invention is only limited by the appended claims.

What is claimed is:

1. A method for managing an authority, comprising:
   acquiring authority use data of a user, the authority use data including a use record of an authority option of the user;
   processing the authority use data to obtain an authority result; and
   sending the authority result to a terminal device, wherein the processing the authority use data comprises:

processing the authority use data based on an authority selection, to obtain an authority confidence value and an initial authority selection; and adjusting the initial authority selection based on the authority confidence value and a threshold value, to obtain the authority result, wherein the adjusting the initial authority selection comprises:

comparing the authority confidence value with the threshold value;

when the authority confidence value is lower than the threshold value, adjusting the initial authority selection to be an inquiry selection as the authority result; and when the authority confidence value is greater than or equal to the threshold value, using the initial authority selection as the authority result.

2. The method according to claim 1, wherein the processing the authority use data based on the authority selection comprises:

performing a de-noising processing on the authority use data; and performing a Support Vector Machine (SVM) training on the de-noised authority use data based on the authority selection of permission or rejection, to obtain the authority confidence value and the initial authority selection.

3. The method according to claim 1, wherein the processing the authority use data based on the authority selection comprises:

performing a de-noising processing on the authority use data;

performing cluster analysis on the authority use data based on a cluster algorithm, to obtain a cluster type of the user; and according to the cluster type of the user, performing a Support Vector Machine (SVM) training on the de-noised authority use data based on the authority selection of permission or rejection, to obtain the authority confidence value and the initial authority selection.

4. The method according to claim 1, wherein the processing the authority use data based on the authority selection comprises:

performing a de-noising processing on the authority use data;

classifying the de-noised authority use data into training set data and testing set data based on a classification ratio; and performing a Support Vector Machine (SVM) training on the training set data based on the authority selection of permission or rejection, to obtain the initial authority selection and the authority confidence value.

5. The method according to claim 4, further comprising:
determining an accuracy degree of the initial authority selection based on the testing set data.

6. A device for managing an authority, comprising:
a processor; and
a memory for storing instructions executed by the processor,
wherein the processor is configured to:

acquire authority use data of a user, the authority use data including a use record of an authority option of the user;

process the authority use data to obtain an authority result; and send the authority result to a terminal device;

wherein, in processing the authority use data to obtain the authority result, the processor is further configured to:

process the authority use data based on an authority selection, to obtain an authority confidence value and an initial authority selection; and adjust the initial authority selection based on the authority confidence value and a threshold value, to obtain an authority result;

wherein, in adjusting the initial authority selection, the processor is further configured to:

compare the authority confidence value with the threshold value;

when the authority confidence value is lower than the threshold value, adjust the initial authority selection to be an inquiry selection as the authority result; and when the authority confidence value is greater than or equal to the threshold value, use the initial authority selection as the authority result.

7. The device according to claim 6, wherein the processor is further configured to:

perform a de-noising processing on the authority use data; and perform a Support Vector Machine (SVM) training on the de-noised authority use data based on the authority selection of permission or rejection, to obtain the authority confidence value and the initial authority selection.

8. The device according to claim 6, wherein the processor is further configured to:

perform a de-noising processing on the authority use data;

perform cluster analysis on the authority use data based on a cluster algorithm, to obtain a cluster type of the user; and according to the cluster type of the user, perform a Support Vector Machine (SVM) training on the de-noised authority use data based on the authority selection of permission or rejection, to obtain the authority confidence value and the initial authority selection.

9. The device according to claim 6, wherein the processor is further configured to:

perform a de-noising processing on the authority use data;

classify the de-noised authority use data into training set data and testing set data in based on a classification ratio; and perform a Support Vector Machine (SVM) training on the training set data based on the authority selection of permission or rejection, to obtain the initial authority selection and the authority confidence value.

10. The device according to claim 9, wherein the processor is further configured to:

determine an accuracy degree of the initial authority selection based on the testing set data.

* * * * *